(12) United States Patent
Li et al.

(10) Patent No.: US 10,764,914 B2
(45) Date of Patent: Sep. 1, 2020

(54) UPLINK INFORMATION PROCESSING METHOD AND APPARATUS

(71) Applicant: Huawei Technologies Co., Ltd., Shenzhen (CN)

(72) Inventors: Yuan Li, Beijing (CN); Lei Guan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/432,088

(22) Filed: Jun. 5, 2019

(65) Prior Publication Data

US 2019/0289621 A1 Sep. 19, 2019

Related U.S. Application Data

(63) Continuation of application No. PCT/CN2017/115035, filed on Dec. 7, 2017.

(30) Foreign Application Priority Data

Dec. 7, 2016 (CN) .......................... 2016 1 1118291

(51) Int. Cl.
*H04W 72/12* (2009.01)
*H04W 72/04* (2009.01)
*H04W 74/08* (2009.01)

(52) U.S. Cl.
CPC ....... *H04W 72/1268* (2013.01); *H04W 72/04* (2013.01); *H04W 72/042* (2013.01);
(Continued)

(58) Field of Classification Search
CPC ............ H04W 72/1268; H04W 72/04; H04W 72/042; H04W 72/0446; H04W 72/12; H04W 72/1289; H04W 74/0816
(Continued)

(56) References Cited

U.S. PATENT DOCUMENTS

| 2015/0071060 A1* | 3/2015 | Bhushan | H04L 5/0091 370/230 |
| 2017/0367110 A1* | 12/2017 | Li | H04W 72/1268 |

(Continued)

FOREIGN PATENT DOCUMENTS

| CN | 105578573 A | * 5/2016 | ............ H04W 52/02 |
| CN | 105578573 A | 5/2016 | |

(Continued)

OTHER PUBLICATIONS

Samsung Electronics: "pCR 45.820 NB-CIoT—Grant-Free Multiple Access for Uplink Transmission", 3GPP TSG GERAN CIoT Ad-hoc#3; GPC150323, Jun. 29-Jul. 2, 2015, 12 pages, Kista, Sweden.

(Continued)

*Primary Examiner* — Afsar M Qureshi
(74) *Attorney, Agent, or Firm* — Slater Matsil, LLP

(57) ABSTRACT

An uplink information processing method and an apparatus, the method including receiving, by a terminal device, first control information sent by a base station device in a first downlink transmission time interval, determining, by the terminal device, a time domain resource based on the first control information, where the time domain resource includes at least one uplink transmission time interval, where a start time unit of the time domain resource is later than the first downlink transmission time interval, and wherein the start time unit is a first uplink transmission time interval of the at least one uplink transmission time interval, and sending, by the terminal device, data information on an uplink data channel, where the uplink data channel corresponds to the at least one uplink transmission time interval in the time domain resource.

20 Claims, 8 Drawing Sheets

(52) U.S. Cl.
CPC ....... *H04W 72/0446* (2013.01); *H04W 72/12* (2013.01); *H04W 72/1289* (2013.01); *H04W 74/0816* (2013.01)

(58) Field of Classification Search
USPC .......................................................... 370/329
See application file for complete search history.

(56) References Cited

U.S. PATENT DOCUMENTS

| | | | |
|---|---|---|---|
| 2018/0006787 A1* | 1/2018 | Chen | H04W 72/0406 |
| 2018/0102821 A1* | 4/2018 | Manolakos | H04B 7/0482 |
| 2018/0124711 A1* | 5/2018 | Hosseini | H04W 52/146 |
| 2019/0261380 A1* | 8/2019 | Iyer | H04B 7/0695 |

FOREIGN PATENT DOCUMENTS

| | | | | |
|---|---|---|---|---|
| CN | 106162909 A | 11/2016 | | |
| EP | 3506709 A1 | 7/2019 | | |
| WO | 2016184307 A1 | 11/2016 | | |
| WO | WO-2016184307 A1 * | 11/2016 | ............ | H04W 72/04 |
| WO | WO-2018184022 A1 * | 10/2018 | ........ | H04W 72/1289 |

OTHER PUBLICATIONS

Ericsson, "Summary of e-mail discussions on downlink control signaling", TSG-RAN WG1 #87; R1-1612908, Nov. 14-18, 2016, 38 pages, Reno, NV, USA.

"3rd Generation Partnership Project; Technical Specification Group Radio Access Network; Evolved Universal Terrestrial Radio Access (E-UTRA); Physical layer procedures (Release 14)," 3GPP TS 36.213 V14.0.0, 406 pages.

"On the LAA uplink: scheduling, LBT, and HARQ," Agenda item: 7.2.3.3, Source: Intel Corporation, Document for: Discussion and Decision, 3GPP TSG RAN WG1 Meeting #80, R1-150507, Athens, Greece, Feb. 9-13, 2015, 4 pages.

\* cited by examiner

UPLINK INFORMATION PROCESSING METHOD AND APPARATUS

CROSS-REFERENCE TO RELATED APPLICATIONS

This application is a continuation of International Application No. PCT/CN2017/115035, filed on Dec. 7, 2017, which claims priority to Chinese Patent Application No. 201611118291.X, filed on Dec. 7, 2016. The disclosures of the aforementioned applications are hereby incorporated by reference in their entireties.

TECHNICAL FIELD

The present disclosure relates to the field of communications technologies, and in particular, to an uplink information processing method and an apparatus.

BACKGROUND

An orthogonal frequency division multiplexing (OFDM) technology is used in a Long Term Evolution (LTE) system. In the LTE system, an uplink resource is allocated at a granularity of a transmission time interval (TTI). A length of one TTI is 14 OFDM symbols, that is, one subframe, and a length of one TTI is 1 ms. In uplink transmission of the LTE system, a base station instructs, by using an uplink grant (UL grant) included in a downlink control channel, user equipment (UE) to send data information on an uplink shared channel (PUSCH) in a corresponding uplink subframe. There is a fixed time sequence relationship between a UL grant and a PUSCH scheduled by using the UL grant. A PUSCH scheduled by using a UL grant included in a downlink control channel in an $n^{th}$ subframe (denoted as subframe # n) is in an $(n+4)^{th}$ subframe (denoted as subframe # n+$_4$). A frequency domain resource occupied by the scheduled PUSCH is indicated by resource allocation (English: Resource Allocation, RA) information carried in the UL grant.

Conventionally, each PUSCH in LTE can be scheduled only by using one UL grant that has a fixed time sequence relationship with the PUSCH. Therefore, when an uplink service requirement is greater than a downlink service requirement, the base station needs to carry only a small amount of downlink data, but the base station needs to configure a large quantity of downlink subframes to schedule sufficient PUSCH resources by using a UL grant. Consequently, time domain resources are wasted, and a listen before talk (LBT) channel access mechanism needs to be performed frequently. If the LBT fails, the UL grant cannot be sent, and an uplink PUSCH cannot be scheduled either, thereby limiting a channel access opportunity. In addition, because of a constraint of the fixed time sequence relationship of the UL grant, the base station cannot schedule a further uplink subframe. Therefore, how to support efficient uplink transmission on an unlicensed spectrum when uplink and downlink services are unbalanced is a problem to be urgently resolved.

In the prior art, scheduling of a plurality of subframes is introduced in enhanced licensed-assisted access (eLAA). A base station device may send a plurality of UL grants in one downlink subframe, and schedule a plurality of consecutive uplink subframes by using one UL grant. In this way, a channel resource waste caused by frequently sending a UL grant can be reduced, and a further UL subframe can be scheduled because timing of the UL grant is flexible. However, in the prior art, a minimum UL grant scheduling delay is 4 ms (the delay is used by the UE to receive and detect the UL grant and perform packet encapsulation on a PUSCH sent on an uplink resource indicated by the UL grant). Therefore, when a downlink burst is less than four subframes, an idle gap still exists between the downlink burst and a scheduled uplink burst, and the UE cannot perform uplink transmission in the idle gap. Consequently, channel resources cannot be efficiently used.

SUMMARY

This application provides an uplink information processing method and an apparatus, to improve time domain resource utilization and improve uplink information processing efficiency.

According to a first aspect, an uplink information sending method is provided, and the method may include receiving, by a terminal device, first control information sent by a base station device in a first downlink transmission time interval, determining, by the terminal device, a time domain resource based on the first control information, where the time domain resource includes at least one uplink transmission time interval, a start time unit of the time domain resource is later than the first downlink transmission time interval, and the start time unit is a first uplink transmission time interval of the at least one uplink transmission time interval, and sending, by the terminal device, data information on an uplink data channel, where the uplink data channel corresponds to the at least one uplink transmission time interval in the time domain resource.

In this application, the terminal device may receive the first control information sent by the base station device, and determine, based on the first control information, the time domain resource that is after the downlink transmission time interval carrying the first control information. A time interval between the start time unit of the time domain resource indicated by the first control information and the downlink transmission time interval is relatively short, and the terminal device may send uplink data information on the time domain resource, without waiting for uplink grant based scheduling, thereby improving time domain resource utilization. In this application, the terminal device may send uplink data information in a time shorter than a scheduling delay of uplink grant based scheduling, so that uplink data information sending efficiency can be improved, the uplink data information can be processed more flexibly, and applicability is higher.

With reference to the first aspect, in a first possible implementation, the determining, by the terminal device, a time domain resource based on the first control information includes determining, by the terminal device, the start time unit based on the first control information.

In this application, the first control information sent by the base station device may be used to indicate the start time unit of the grantless time domain resource, and the terminal device may send uplink data information starting from the start time unit. The first control information is used to indicate the start time unit of the grantless time domain resource, so that a resource indication manner is more flexible, an operation is simpler, and applicability is higher.

With reference to the first aspect or the first possible implementation of the first aspect, in a second possible implementation, the determining, by the terminal device, a time domain resource based on the first control information includes determining, by the terminal device, a length of the time domain resource or an end moment of the time domain resource based on the first control information.

In this application, the first control information sent by the base station device may be used to indicate the length and the end moment of the grantless time domain resource, so that a resource indication manner is more flexible, an operation manner is simpler, and applicability is higher.

With reference to the first aspect, in a third possible implementation, the determining, by the terminal device, a time domain resource based on the first control information includes determining, by the terminal device, the start time unit based on the first control information, and determining an end moment of the time domain resource based on the start time unit and a length of the time domain resource, where the length of the time domain resource is a predefined length or a length configured based on first higher layer signaling sent by the base station device.

In this application, the start time unit of the grantless time domain resource may be determined by using the first control information sent by the base station device, and the end moment of the time domain resource is determined based on the length that is of the time domain resource and that is predefined or that is configured based on the higher layer signaling, so that the time domain resource can be determined. In this way, signaling overheads are relatively low. In addition, for the length that is of the time domain resource and that is configured based on the higher layer signaling, specific resource configuration flexibility is maintained.

With reference to the first possible implementation of the first aspect to the third possible implementation of the first aspect, in a fourth possible implementation, the first control information is used to indicate a quantity of symbols occupied by the base station device in a last subframe or a last transmission time interval of a downlink burst, the downlink burst includes at least one consecutive downlink transmission time interval, and the at least one consecutive downlink transmission time interval includes the first downlink transmission time interval, and the determining, by the terminal device, the start time unit based on the first control information includes determining, by the terminal device, the start time unit based on the quantity of symbols.

In this application, the first control information sent by the base station device may be used to indicate the quantity of symbols occupied by the base station device in the last subframe or the last transmission time interval of the downlink burst, and the start time unit of the grantless time domain resource is determined based on the quantity of symbols, so that a manner of determining the grantless time domain resource is more flexible, applicability is higher, and signaling overheads are relatively low.

With reference to the first possible implementation of the first aspect to the third possible implementation of the first aspect, in a fifth possible implementation, the start time unit is later than a target time unit, and a time interval between the target time unit and the start time unit is a first time interval, and the target time unit is the first downlink transmission time interval, or the target time unit is a subframe in which the first downlink transmission time interval exists, or the target time unit is a last subframe or a last transmission time interval of a downlink burst, the downlink burst includes at least one consecutive downlink transmission time interval, and the at least one consecutive downlink transmission time interval includes the first downlink transmission time interval.

In this application, the downlink transmission time interval carrying the first control information, the subframe in which the downlink transmission time interval exists, or the last subframe or transmission time interval of the downlink burst in which the downlink transmission time interval exists may be determined as the target time unit by using the first control information sent by the base station device, and a time domain resource after the target time unit is determined as the grantless time domain resource, so that time domain resource utilization can be improved, and uplink data processing efficiency can also be improved.

With reference to the fifth possible implementation of the first aspect, in a sixth possible implementation, the determining, by the terminal device, the start time unit based on the first control information includes determining, by the terminal device, the target time unit based on the first control information, and determining, by the terminal device, the start time unit based on the target time unit and the first time interval, where the first time interval is a predefined time interval, or the first time interval is configured by using second higher layer signaling sent by the base station device.

In this application, the target time unit used to determine the grantless time domain resource may be determined based on the first control information sent by the base station device, and the first time interval used to determine the grantless time domain resource is determined in a predefined manner, a higher layer signaling configuration manner, or the like, so that the grantless time domain resource can be determined. In this way, diversity of a manner of determining the time domain resource is improved, signaling overheads are lower. In addition, specific resource configuration flexibility is maintained in the higher layer signaling configuration manner.

With reference to the fifth possible implementation of the first aspect, in a seventh possible implementation, the first control information is used to indicate the first time interval, and the determining, by the terminal device, the start time unit based on the first control information includes determining, by the terminal device, the start time unit based on the first time interval and the target time unit.

In this application, the first time interval used to determine the grantless time domain resource may be determined based on the first control information sent by the base station device, so that the start time unit can be determined based on the target time unit. In this way, diversity of a manner of determining the start time unit is improved, and an operation of indicating the time domain resource is more flexible.

With reference to the seventh possible implementation of the first aspect, in an eighth possible implementation, before the determining, by the terminal device, the start time unit based on the first time interval and the target time unit, the method further includes determining, by the terminal device, the target time unit based on the first control information.

In this application, the target time unit used to determine the grantless time domain resource may be determined based on the first control information sent by the base station device, so that diversity of a manner of determining the target time unit is improved.

With reference to any one of the first aspect and the first possible implementation to the eighth possible implementation of the first aspect, in a ninth possible implementation, a time interval between the first downlink transmission time interval and the start time unit is less than a second time interval, the second time interval is a minimum time interval between a second downlink transmission time interval and a target uplink transmission time interval, the second downlink transmission time interval carries the uplink grant, and the target uplink transmission time interval corresponds to an uplink channel scheduled by using the uplink grant, the uplink grant is used to indicate a transport format of the uplink channel, and the transport format of the uplink channel includes at least one of the following information a time domain resource occupied by the uplink channel, a frequency domain resource occupied by the uplink data channel, a modulation and coding scheme of the uplink data channel, and a time interval between the second downlink transmission time interval and the target uplink transmission time interval.

In this application, the time interval between the downlink transmission time interval carrying the first control information sent by the base station device and the start time unit of the grantless time domain resource is less than a minimum scheduling delay of UL grant based scheduling, so that resource utilization can be improved, and uplink data transmission efficiency can be improved. The minimum scheduling delay of UL grant based scheduling is a time interval between a UL grant and an earliest PUSCH scheduled by using the UL grant. In comparison with a conventional UL grant based scheduling manner, in this application, more time domain resources can be used, channel utilization efficiency can be higher, uplink information processing efficiency can be improved, and an uplink information processing manner has higher applicability. The uplink grant provided in this application may be used to indicate the transport format of the uplink channel, and the transport format of the uplink channel may include one of a plurality of pieces of content, so that uplink information processing efficiency can be improved, and an uplink information processing manner has higher applicability.

With reference to any one of the first aspect and the first possible implementation to the ninth possible implementation of the first aspect, in a tenth possible implementation, the first control information is common control information.

In this application, the common control information may be used to indicate the grantless time domain resource, so that overheads are reduced, an operation is simple, and applicability is high.

With reference to any one of the first aspect and the first possible implementation to the tenth possible implementation of the first aspect, in an eleventh possible implementation, before the sending, by the terminal device, data information on an uplink data channel, the method further includes determining, by the terminal device, a transport format of the uplink data channel, where the transport format of the uplink data channel includes at least one of the following information a frequency domain resource occupied by the uplink data channel, a modulation and coding scheme of the uplink data channel, transmit power of the uplink data channel, a code sequence of a demodulation reference signal in the uplink data channel, and a transport block size TBS carried on the uplink data channel, and any one of the at least one piece of information included in the transport format of the uplink data channel is predefined information or information configured based on third higher layer signaling sent by the base station device.

Transport formats of the uplink data channel provided in this application are more diversified, a manner of setting the transport format of the uplink data channel is more flexible, and an uplink information processing manner has higher applicability.

With reference to any one of the first aspect and the first possible implementation to the eleventh possible implementation of the first aspect, in a twelfth possible implementation, before the sending, by the terminal device, data information on an uplink data channel, the method further includes performing, by the terminal device, listen before talk (LBT) on a carrier on which the uplink data channel is located, and detecting that the channel is idle.

In the uplink information processing method provided in this application, before sending uplink data, the terminal device may perform LBT and detect that the channel is idle, so that effectiveness of sending uplink data information can be ensured, and applicability is higher.

According to a second aspect, an uplink information receiving method is provided, and the method may include sending, by a base station device, first control information to a terminal device in a first downlink transmission time interval, where the first control information is used to indicate a time domain resource, the time domain resource includes at least one uplink transmission time interval, a start time unit of the time domain resource is later than the first downlink transmission time interval, and the start time unit is a first uplink transmission time interval of the at least one uplink transmission time interval, and receiving, by the base station device on an uplink data channel, data information sent by the terminal device, where the uplink data channel corresponds to the at least one uplink transmission time interval in the time domain resource.

With reference to the second aspect, in a first possible implementation, the first control information is used to indicate the start time unit.

With reference to the second aspect or the first possible implementation of the second aspect, in a second possible implementation, the first control information is used to indicate a length of the time domain resource or an end moment of the time domain resource.

With reference to the second aspect, in a third possible implementation, the first control information is used to indicate the start time unit, an end moment of the time domain resource is obtained based on the start time unit and a length of the time domain resource, and the length of the time domain resource is a predefined length or a length configured based on first higher layer signaling configured by the base station device for the terminal device.

With reference to either of the first possible implementation of the second aspect and the third possible implementation of the second aspect, in a fourth possible implementation, the first control information is used to indicate a quantity of symbols occupied by the base station device in a last subframe or a last transmission time interval of a downlink burst, the downlink burst includes at least one consecutive downlink transmission time interval, the at least one consecutive downlink transmission time interval includes the first downlink transmission time interval, and the quantity of symbols is used to determine the start time unit.

With reference to either of the first possible implementation of the second aspect and the second possible implementation of the second aspect, in a fifth possible implementation, the start time unit is later than a target time unit, and a time interval between the target time unit and the start time unit is a first time interval, and the target time unit is the first downlink transmission time interval, or the target time unit is a subframe in which the first downlink transmission time interval exists, or the target time unit is a last subframe or a last transmission time interval of a downlink burst, the downlink burst includes at least one consecutive downlink transmission time interval, and the at least one consecutive downlink transmission time interval includes the first downlink transmission time interval.

With reference to the fifth possible implementation of the second aspect, in a sixth possible implementation, the first control information is used to indicate the target time unit, the start time unit is obtained based on the target time unit and the first time interval, and the first time interval is a predefined time interval, or the first time interval is configured by using second higher layer signaling configured by the base station device for the terminal device.

With reference to the fifth possible implementation of the second aspect, in a seventh possible implementation, the first control information is used to indicate the first time interval, and the start time unit is obtained based on the target time unit and the first time interval.

With reference to the seventh possible implementation of the second aspect, in an eighth possible implementation, the target time unit is indicated by the first control information.

With reference to any one of the second aspect and the first possible implementation to the eighth possible implementation of the second aspect, in a ninth possible implementation, a time interval between the first downlink transmission time interval and the start time unit is less than a second time interval, the second time interval is a minimum time interval between a second downlink transmission time interval and a target uplink transmission time interval, the second downlink transmission time interval carries the uplink grant, and the target uplink transmission time interval corresponds to an uplink channel scheduled by using the uplink grant, the uplink grant is used to indicate a transport format of the uplink channel, and the transport format of the uplink channel includes at least one of the following information a time domain resource occupied by the uplink channel, a frequency domain resource occupied by the uplink data channel, a modulation and coding scheme of the uplink data channel, and a time interval between the second downlink transmission time interval and the target uplink transmission time interval.

With reference to any one of the second aspect and the first possible implementation to the ninth possible implementation of the second aspect, in a tenth possible implementation, the first control information is common control information.

With reference to any one of the second aspect and the first possible implementation to the tenth possible implementation of the second aspect, in an eleventh possible implementation, a transport format of the uplink data channel includes at least one of the following information a frequency domain resource occupied by the uplink data channel, a modulation and coding scheme of the uplink data channel, transmit power of the uplink data channel, a code sequence of a demodulation reference signal in the uplink data channel, and a transport block size TBS carried on the uplink data channel, and any one of the at least one piece of information included in the transport format of the uplink data channel is predefined information or information configured based on third higher layer signaling configured by the base station device for the terminal device.

According to a third aspect, a terminal device is provided, and the terminal device may include a receiving module, configured to receive first control information sent by a base station device in a first downlink transmission time interval, a determining module, configured to determine a time domain resource based on the first control information received by the receiving module, where the time domain resource includes at least one uplink transmission time interval, a start time unit of the time domain resource is later than the first downlink transmission time interval, and the start time unit is a first uplink transmission time interval of the at least one uplink transmission time interval, and a sending module, configured to send data information on an uplink data channel, where the uplink data channel corresponds to the at least one uplink transmission time interval in the time domain resource determined by the determining module.

With reference to the third aspect, in a first possible implementation, the determining module is configured to determine the start time unit based on the first control information received by the receiving module.

With reference to the third aspect or the first possible implementation of the third aspect, in a second possible implementation, the determining module is configured to determine a length of the time domain resource or an end moment of the time domain resource based on the first control information received by the receiving module.

With reference to the third aspect, in a third possible implementation, the determining module is configured to determine the start time unit based on the first control information received by the receiving module, and determine an end moment of the time domain resource based on the start time unit and a length of the time domain resource, where the length of the time domain resource is a predefined length or a length configured based on first higher layer signaling sent by the base station device.

With reference to the first possible implementation of the third aspect to the third possible implementation of the third aspect, in a fourth possible implementation, the first control information is used to indicate a quantity of symbols occupied by the base station device in a last subframe or a last transmission time interval of a downlink burst, the downlink burst includes at least one consecutive downlink transmission time interval, and the at least one consecutive downlink transmission time interval includes the first downlink transmission time interval, and the determining module is configured to determine the start time unit based on the quantity of symbols.

With reference to the first possible implementation of the third aspect to the third possible implementation of the third aspect, in a fifth possible implementation, the start time unit is later than a target time unit, and a time interval between the target time unit and the start time unit is a first time interval, and the target time unit is the first downlink transmission time interval, or the target time unit is a subframe in which the first downlink transmission time interval exists, or the target time unit is a last subframe or a last transmission time interval of a downlink burst, the downlink burst includes at least one consecutive downlink transmission time interval, and the at least one consecutive downlink transmission time interval includes the first downlink transmission time interval.

With reference to the fifth possible implementation of the third aspect, in a sixth possible implementation, the determining module is configured to determine the target time unit based on the first control information received by the receiving module, and determine the start time unit based on the target time unit and the first time interval, where the first time interval is a predefined time interval, or the first time interval is configured by using second higher layer signaling sent by the base station device.

With reference to the fifth possible implementation of the third aspect, in a seventh possible implementation, the first control information is used to indicate the first time interval, and the determining module is configured to determine the start time unit based on the first time interval and the target time unit.

With reference to the seventh possible implementation of the third aspect, in an eighth possible implementation, the determining module is further configured to determine the target time unit based on the first control information received by the receiving module.

With reference to any one of the third aspect and the first possible implementation to the eighth possible implementation of the third aspect, in a ninth possible implementation, a time interval between the first downlink transmission time interval and the start time unit is less than a second time interval, the second time interval is a minimum time interval between a second downlink transmission time interval and a target uplink transmission time interval, the second downlink transmission time interval carries the uplink grant, and the target uplink transmission time interval corresponds to an uplink channel scheduled by using the uplink grant, the uplink grant is used to indicate a transport format of the uplink channel, and the transport format of the uplink channel includes at least one of the following information a time domain resource occupied by the uplink channel, a frequency domain resource occupied by the uplink data channel, a modulation and coding scheme of the uplink data channel, and a time interval between the second downlink transmission time interval and the target uplink transmission time interval.

With reference to any one of the third aspect and the first possible implementation to the ninth possible implementation of the third aspect, in a tenth possible implementation, the first control information is common control information.

With reference to any one of the third aspect and the first possible implementation to the tenth possible implementation of the third aspect, in an eleventh possible implementation, the determining module is further configured to determine a transport format of the uplink data channel, where the transport format of the uplink data channel includes at least one of the following information a frequency domain resource occupied by the uplink data channel, a modulation and coding scheme of the uplink data channel, transmit power of the uplink data channel, a code sequence of a demodulation reference signal in the uplink data channel, and a transport block size TBS carried on the uplink data channel, and any one of the at least one piece of information included in the transport format of the uplink data channel is predefined information or information configured based on third higher layer signaling sent by the base station device.

With reference to any one of the third aspect and the first possible implementation to the eleventh possible implementation of the third aspect, in a twelfth possible implementation, the terminal device further includes a detection module, configured to perform listen before talk (LBT) on a carrier on which the uplink data channel is located, and detect that the channel is idle.

According to a fourth aspect, a base station device is provided, and the base station device may include a sending module, configured to send first control information to a terminal device in a first downlink transmission time interval, where the first control information is used to indicate a time domain resource, the time domain resource includes at least one uplink transmission time interval, a start time unit of the time domain resource is later than the first downlink transmission time interval, and the start time unit is a first uplink transmission time interval of the at least one uplink transmission time interval, and a receiving module, configured to receive, on an uplink data channel, data information sent by the terminal device, where the uplink data channel corresponds to the at least one uplink transmission time interval in the time domain resource.

With reference to the fourth aspect, in a first possible implementation, the first control information is used to indicate the start time unit.

With reference to the fourth aspect or the first possible implementation of the fourth aspect, in a second possible implementation, the first control information is used to indicate a length of the time domain resource or an end moment of the time domain resource.

With reference to the fourth aspect, in a third possible implementation, the first control information is used to indicate the start time unit, an end moment of the time domain resource is obtained based on the start time unit and a length of the time domain resource, and the length of the time domain resource is a predefined length or a length configured based on first higher layer signaling configured by the base station device for the terminal device.

With reference to either of the first possible implementation of the fourth aspect and the second possible implementation of the fourth aspect, in a fourth possible implementation, the first control information is used to indicate a quantity of symbols occupied by the base station device in a last subframe or a last transmission time interval of a downlink burst, the downlink burst includes at least one consecutive downlink transmission time interval, the at least one consecutive downlink transmission time interval includes the first downlink transmission time interval, and the quantity of symbols is used to determine the start time unit.

With reference to either of the first possible implementation of the fourth aspect and the second possible implementation of the fourth aspect, in a fifth possible implementation, the start time unit is later than a target time unit, and a time interval between the target time unit and the start time unit is a first time interval, and the target time unit is the first downlink transmission time interval, or the target time unit is a subframe in which the first downlink transmission time interval exists, or the target time unit is a last subframe or a last transmission time interval of a downlink burst, the downlink burst includes at least one consecutive downlink transmission time interval, and the at least one consecutive downlink transmission time interval includes the first downlink transmission time interval.

With reference to the fifth possible implementation of the fourth aspect, in a sixth possible implementation, the first control information is used to indicate the target time unit, the start time unit is obtained based on the target time unit and the first time interval, and the first time interval is a predefined time interval, or the first time interval is configured by using second higher layer signaling configured by the base station device for the terminal device.

With reference to the fifth possible implementation of the fourth aspect, in a seventh possible implementation, the first control information is used to indicate the first time interval, and the start time unit is obtained based on the target time unit and the first time interval.

With reference to the sixth possible implementation of the fourth aspect, in an eighth possible implementation, the target time unit is indicated by the first control information.

With reference to any one of the fourth aspect and the first possible implementation to the eighth possible implementation of the fourth aspect, in a ninth possible implementation, a time interval between the first downlink transmission time interval and the start time unit is less than a second time interval, the second time interval is a minimum time interval between a second downlink transmission time interval and a target uplink transmission time interval, the second downlink transmission time interval carries the uplink grant, and the target uplink transmission time interval corresponds to an uplink channel scheduled by using the uplink grant, the uplink grant is used to indicate a transport format of the uplink channel, and the transport format of the uplink channel includes at least one of the following information a time domain resource occupied by the uplink channel, a frequency domain resource occupied by the uplink data channel, a modulation and coding scheme of the uplink data channel, and a time interval between the second downlink transmission time interval and the target uplink transmission time interval.

With reference to any one of the fourth aspect and the first possible implementation to the ninth possible implementation of the fourth aspect, in a tenth possible implementation, the first control information is common control information.

With reference to any one of the fourth aspect and the first possible implementation to the tenth possible implementation of the fourth aspect, in an eleventh possible implementation, a transport format of the uplink data channel includes at least one of the following information a frequency domain resource occupied by the uplink data channel, a modulation and coding scheme of the uplink data channel, transmit power of the uplink data channel, a code sequence of a demodulation reference signal in the uplink data channel, and a transport block size TBS carried on the uplink data channel, and any one of the at least one piece of information included in the transport format of the uplink data channel is predefined information or information configured based on third higher layer signaling configured by the base station device for the terminal device.

According to a fifth aspect, an uplink information processing system is provided, and the system may include the terminal device according to the third aspect and the base station device according to the fourth aspect.

According to a sixth aspect, a terminal device is provided, and the terminal device may include a memory and a processor, where the memory is configured to store a set of program code, and the processor is configured to invoke the program code stored in the memory, to perform various implementations provided in the uplink information sending method according to the first aspect.

According to a seventh aspect, a base station device is provided, and the base station device may include a memory and a processor, where the memory is configured to store a set of program code, and the processor is configured to invoke the program code stored in the memory, to perform various implementations provided in the uplink information receiving method according to the second aspect.

In this application, the base station device may send the first control information to the terminal device, and indicate, by using the first control information, the time domain resource that is after the downlink transmission time interval carrying the first control information. A time interval between the start time unit of the time domain resource indicated by the first control information and the downlink transmission time interval is relatively short, and the terminal device may send uplink data information on the time domain resource, without waiting for uplink grant based scheduling, thereby improving time domain resource utilization. In this application, the terminal device may send uplink data information in a time shorter than a scheduling delay of an uplink grant based scheduling scenario, so that uplink data information sending efficiency can be improved, and the base station device may receive, in a shorter time, the uplink data information sent by the terminal device, so that the uplink data information can be processed more flexibly, and applicability is higher.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION OF ILLUSTRATIVE EMBODIMENTS

Figure 1:
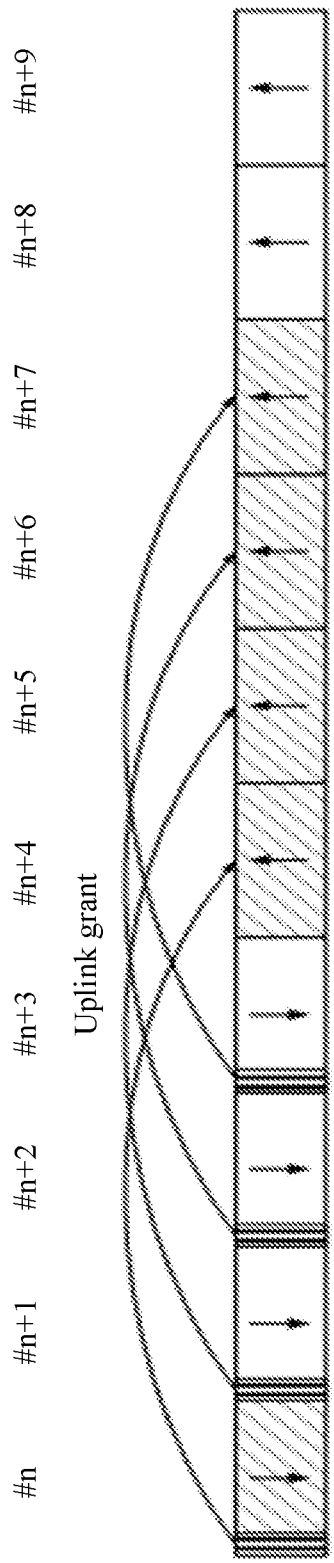
FIG. 1 is a schematic diagram of a position relationship between an uplink subframe and a downlink subframe in resource scheduling.

In an OFDM technology used in an LTE system, a smallest resource unit used for data transmission is a resource element (RE), and one RE corresponds to one OFDM symbol in time domain and one subcarrier in frequency domain. On this basis, a resource block (RB) includes a plurality of consecutive OFDM symbols in time domain and a plurality of consecutive subcarriers in frequency domain, and the RB is a basic unit for resource scheduling. A single carrier is used for uplink transmission of the LTE system, and one RE corresponds to one single carrier frequency division multiple access (SC-FDMA) symbol and one subcarrier in frequency domain. In uplink transmission of the LTE system, a UL grant is UE-specific control signaling, there is a fixed time sequence relationship between a UL grant and a PUSCH scheduled by using the UL grant, and a PUSCH scheduled by using a UL grant included in a downlink control channel in subframe # n is in subframe # n+4.

To extend available bandwidth, a licensed-assisted access using Long Term Evolution (LAA-LTE) technology is introduced in Release 13, and an available spectrum may be extended to an unlicensed frequency band by using a carrier aggregation (CA) technology. A licensed spectrum is used to implement seamless coverage and carry some services with a high delay requirement, and an unlicensed spectrum is used to carry some data services. To implement, on the unlicensed spectrum, friendly coexistence between an LAA system and both a base station and UE belonging to different operators from the LAA system and friendly coexistence between the LAA system and an inter-RAT wireless node such as a Wi-Fi wireless node, the LAA system uses an LBT channel access mechanism, and the base station sends downlink information after detecting that a channel is idle. Specifically, LBT in downlink transmission is a random backoff-based clear channel assessment (CCA) (Type 1 UL channel access). A specific procedure is as follows. A sending node evenly generates a backoff timer N at random between 0 and a contention window size (CWS), and performs listening at a granularity of a CCA slot. If the sending node detects, in the CCA slot, that a channel is idle, a value of the backoff timer is decreased by 1, or if the sending node detects that a channel is busy, the backoff timer is suspended. In other words, a value of the backoff timer N remains unchanged when the channel is busy, until the sending node detects that the channel is idle. When the value of the backoff timer is decreased to 0, the sending node may immediately occupy the channel. After the sending node occupies the channel, a maximum time length that may be used for continuously sending information is a maximum channel occupancy time (MCOT). After continuously occupying the channel for the length, the sending node needs to release the channel, and can perform access again only after performing LBT again. A determining criterion of a channel status is as follows. A wireless communications device compares received power of a channel in a CCA slot with an energy detection threshold. If the power is greater than the threshold, the channel is busy, or if the power is less than the threshold, the channel is idle.

In eLAA introduced in Release 14, uplink transmission on the unlicensed spectrum is further supported. Consistent with an existing LTE system, eLAA uplink transmission is scheduled by the base station by sending a UL grant, and before the scheduled uplink transmission, a terminal device can perform sending only after the terminal device determines, through LBT, that a channel is idle. In addition, the uplink transmission supports two LBT types: random backoff-based CCA and single slot CCA. The random backoff-based CCA is similar to that in downlink transmission. A procedure of the single slot CCA is as follows. The sending node performs CCA listening in a single slot of 25 μs. If the sending node detects, in the CCA slot of 25 μs, that a channel is idle, the sending node may immediately access the channel, or if the sending node detects, in the CCA slot of 25 μs, that a channel is busy, the sending node does not send information, and may wait for a next uplink data channel and perform next single slot CCA listening before the next uplink data channel. To improve an uplink channel access opportunity, an MCOT occupied by the base station after the base station preempts a channel may be shared with the terminal device for use, and the terminal device may perform single slot CCA in the MCOT, and needs to perform random backoff-based CCA after the MCOT ends. Specifically, the base station notifies the terminal device of a start moment and duration of an uplink burst by using cell-specific control signaling (CPDCCH) included in a downlink control channel. In uplink transmission in the uplink burst, the terminal device may perform single slot CCA to access a channel, and in uplink transmission beyond the uplink burst, the terminal device needs to perform random backoff-based CCA to access the channel. In addition, the CPDCCH is further used to indicate a quantity of symbols in a downlink end subframe, trigger two-stage uplink scheduling, and the like. A last downlink subframe of a downlink burst is referred to as an end subframe. To send downlink information, the base station may not occupy all symbols in the downlink end subframe, but occupies a symbol that ranks ahead in the subframe without occupying a symbol that ranks behind in the subframe. The symbol that ranks behind remains idle, so that LBT is performed for uplink transmission in a next subframe, or the symbol that ranks behind is used by the UE to send an uplink control channel and is used to carry random access information, an uplink sounding reference signal, a downlink hybrid automatic repeat request (HARQ) ACK feedback, and the like. For example, the last subframe (the end subframe) of the downlink burst includes 14 symbols, and the base station occupies first K symbols in the end subframe to send downlink information, where K may be one of 3, 6, 9, 10, 11, 12, and 14.

Conventionally, each PUSCH in LTE can be scheduled only by using one UL grant that has a fixed time sequence relationship with the PUSCH. Therefore, when an uplink service requirement is greater than a downlink service requirement, the base station needs to carry only a small amount of downlink data, but the base station needs to configure a large quantity of downlink subframes to schedule sufficient PUSCH resources by using a UL grant. Consequently, time domain resources are wasted, and LBT needs to be performed frequently, thereby limiting a channel access opportunity. Referring to FIG. 1, FIG. 1 is a schematic diagram of a position relationship between an uplink subframe and a downlink subframe in resource scheduling. As shown in FIG. 1, when the base station needs to schedule four uplink subframes, the base station needs to configure four downlink subframes and send one UL grant in each downlink subframe, but the downlink subframes cannot be used for uplink transmission. The UL grant sent in each downlink subframe is used to schedule an uplink subframe corresponding to the downlink subframe. For example, a UL grant sent in downlink subframe # n is used to schedule uplink subframe # n+4. Further, when no downlink PDSCH needs to be sent in a downlink subframe, and there is no PDSCH information between two adjacent PDCCHs carrying a UL grant, the base station may need to stop occupying a channel. Therefore, channel occupation is discontinuous. The base station still needs to perform LBT before sending a next UL grant. If the LBT fails, the UL grant cannot be sent, and an uplink PUSCH cannot be scheduled either. In addition, because there is a fixed time sequence timing relationship between a UL grant and a PUSCH scheduled by using the UL grant, for example, only a PUSCH in subframe # n+4 can be scheduled by using a UL grant in subframe # n, and the base station cannot schedule a further uplink subframe.

It can be learned that, how to support efficient uplink transmission on an unlicensed spectrum when uplink and downlink services are unbalanced is a problem to be urgently resolved. Therefore, the embodiments of the present disclosure provide an uplink information processing method and an apparatus, to indicate, by using downlink control information sent by a base station device, that a time domain resource available to a terminal device is a time domain resource after downlink transmission ends. The terminal device may send uplink data on the time domain resource indicated by the downlink control information, without sending, by the base station device, a UL grant in advance for scheduling. The terminal device may perform, based on a preconfigured uplink data channel format, packet encapsulation in advance on data information to be sent on a PUSCH, and immediately send the uplink data information on the corresponding time domain resource after detecting the downlink control information, without sending a scheduling request (SR) and waiting for a UL grant before sending the uplink data information, thereby reducing an uplink transmission delay and improving uplink transmission efficiency.

It should be noted that the embodiments of the present disclosure may be applied to a wireless communications system operating on an unlicensed spectrum, or may be applied to a wireless communications system operating on a licensed spectrum. A base station device in the wireless communications system sends downlink information (or referred to as downlink data information) on the licensed spectrum or the unlicensed spectrum, and a terminal device in the wireless communications system sends uplink information (or referred to as uplink data information) on the licensed spectrum or the unlicensed spectrum. Scheduling delays of uplink transmission, scheduled based on a UL grant, on the licensed spectrum and the unlicensed spectrum are both 4 ms. Therefore, in the embodiments of the present disclosure, regardless of whether data information is sent in an idle gap brought by the scheduling delay or on a grantless (Grant Free) PUSCH, a delay can be reduced, and uplink transmission efficiency can be improved. In addition, for uplink transmission on the unlicensed spectrum, in an implementation provided in the embodiments of the present disclosure, operations of sending an SR and waiting for a UL grant by the terminal device can be avoided, thereby additionally avoiding an access opportunity loss caused when a channel cannot be preempted by using the SR and the UL grant. Therefore, the implementation has high applicability.

Network elements in the implementation provided in the embodiments of the present disclosure are mainly a base station device and a terminal device (or referred to as UE) that may operate on a licensed spectrum or an unlicensed spectrum. The base station device includes a macro base station, a micro cell, a pico cell, a home eNodeB, a remote radio-frequency head, a relay, and the like, and may be specifically determined based on an actual application scenario. The base station device is not limited herein. The terminal device may include a mobile phone, a notebook computer that can access an LTE system, a tablet computer, and the like, and may be specifically determined based on an actual application scenario. The terminal device is not limited herein. With reference to FIG. 2 to FIG. 12, the following describes the uplink information processing method and the apparatus provided in the embodiments of the present disclosure.

Figure 2:
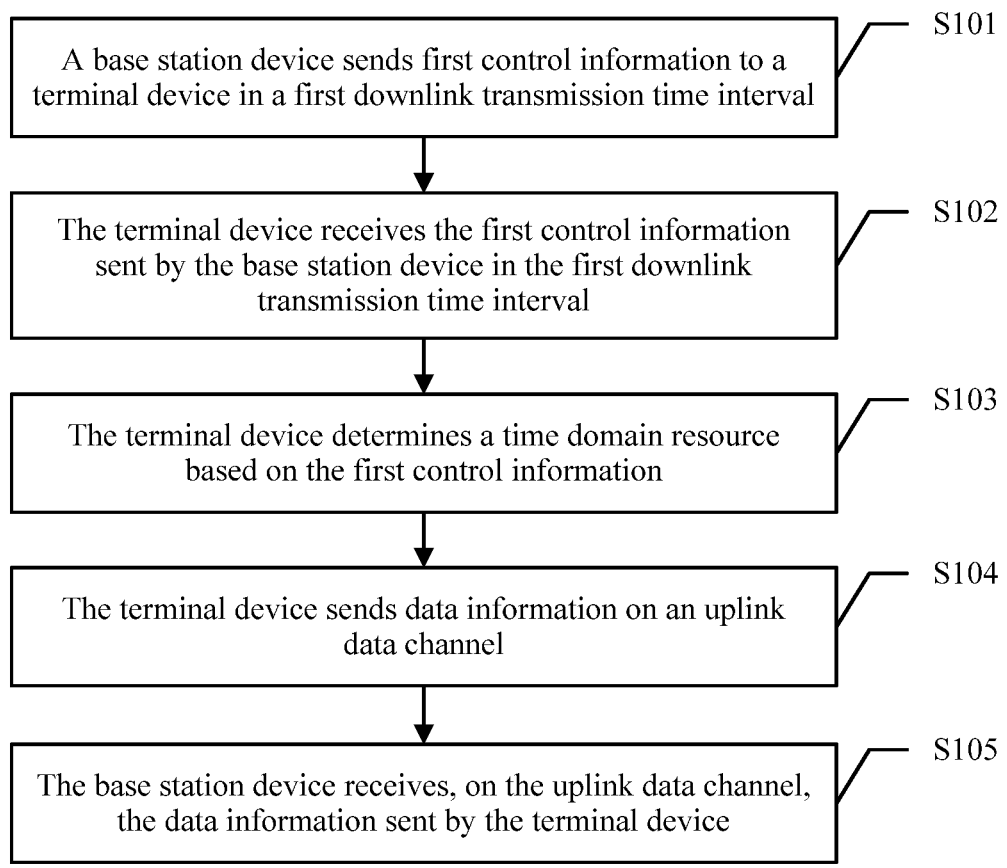
FIG. 2 is a schematic flowchart of an uplink information processing method according to an embodiment of the present disclosure.

Referring to FIG. 2, FIG. 2 is a schematic flowchart of an uplink information processing method according to an embodiment of the present disclosure. The method provided in this embodiment of the present disclosure includes the following steps.

S101. A base station device sends first control information to a terminal device in a first downlink transmission time interval.

S102. The terminal device receives the first control information sent by the base station device in the first downlink transmission time interval.

During specific implementation, for conventional uplink transmission scheduled by using a UL grant, after receiving an SR sent by the terminal device, the base station device needs to schedule, by using a UL grant, the terminal device to send uplink data information. Because of a delay between receiving, by the base station device, the SR sent by the terminal device and receiving, by the terminal device, the UL grant sent by the base station device, an uplink transmission delay is relatively high. In this embodiment of the present disclosure, a grantless mechanism is introduced, so that the terminal device does not need to send an SR to the base station device, nor receive a UL grant sent by the base station device, but directly sends uplink data information on an uplink PUSCH resource configured by the base station device, thereby reducing a delay and improving resource utilization.

In some feasible implementations, the base station device may send the first control information in the first downlink transmission time interval (the first downlink TTI). The first control information is used to indicate a grantless time domain resource. During specific implementation, the base station device may allocate a same grantless time-frequency resource to a plurality of terminal devices, and perform statistical multiplexing to avoid a resource waste caused when the terminal device has no uplink data to send. In addition, the base station device may control a quantity of terminal devices for which a same grantless resource is configured, to avoid a collision between data information sending occurring because there are an excessively large quantity of terminal devices and a plurality of terminal devices send data information on one time domain resource at the same time.

Figure 3:
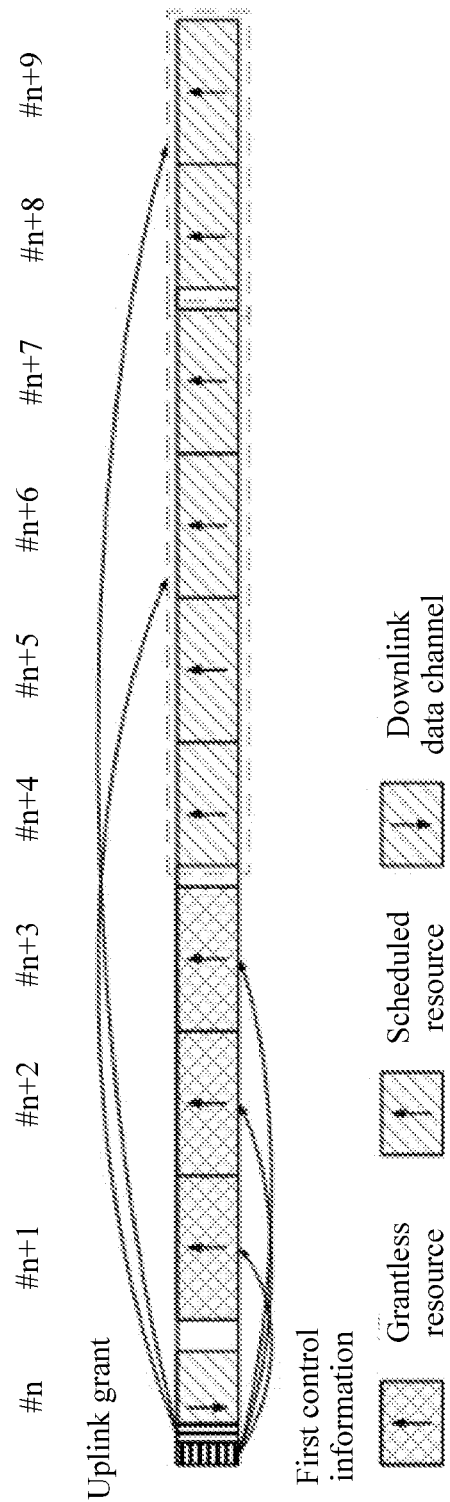
FIG. 3 is another schematic diagram of a position relationship between an uplink subframe and a downlink subframe in resource scheduling.

In some feasible implementations, a grantless time domain resource and frequency domain resource may be semi-statically configured by using higher layer signaling sent by the base station device. However, considering that a downlink service arrives at random, an occasion for performing a downlink transmission by the base station device and an end moment of downlink transmission (for example, a last subframe in downlink transmission or a last TTI in downlink transmission) are dynamic. In addition, LBT needs to be performed before downlink transmission, so that a dynamic feature of the downlink transmission occasion is more obvious. Therefore, the end moment of downlink transmission is very likely to be relatively distant from a start time unit of a preconfigured grantless time domain resource, and an idle gap between a DL and a UL still cannot be effectively used to transmit uplink data information. On this basis, in addition to an implementation of configuring a grantless time domain resource based on higher layer signaling sent by the base station device, this embodiment of the present disclosure provides an implementation of dynamically indicating a time domain resource. In this embodiment of the present disclosure, the first control information delivered by the base station device may be used to explicitly or implicitly indicate the grantless time domain resource, including indicating a start time unit of the time domain resource and/or a length of the time domain resource and/or an end moment of the time domain resource, and the like. When the terminal device needs to transmit uplink data, the terminal device may perform, based on a preconfigured uplink data channel format, packet encapsulation in advance on data information to be sent on a PUSCH, and after receiving the first control information sent by the base station device, determine a grantless time domain resource based on the first control information, and then send, on the time domain resource indicated by the first control information, uplink data obtained after the packet encapsulation. Referring to FIG. 3, FIG. 3 is another schematic diagram of a position relationship between an uplink subframe and a downlink subframe in resource scheduling. As shown in FIG. 3, a nearest downlink subframe (or downlink TTI) scheduled by the base station device by sending a UL grant in downlink subframe # n is downlink subframe # $n+_4$. To utilize time domain resources of three downlink subframes, namely, downlink subframe # n+1 to downlink subframe # n+3, the base station device may send the first control information in downlink subframe # n, to indicate that the three downlink subframes, namely, downlink subframe # n+1 to downlink subframe # n+3 are grantless time domain resources. After receiving the first control information, the terminal device may determine, based on the first control information, that the time domain resources can be used to send uplink data information, in other words, the terminal device may determine, based on the first control information, that the time domain resources are grantless time domain resources.

It should be understood that a downlink transmission time interval (a downlink TTI) is a smallest transmission time unit for downlink transmission, and an uplink transmission time interval (an uplink TTI) is a smallest transmission time unit for uplink transmission. It should be understood that data information transmitted in the downlink transmission time interval includes downlink control information, and the downlink control information may be used to perform downlink resource scheduling on a downlink data channel that exists in the downlink transmission time interval, or may be used to perform uplink resource scheduling on an uplink data channel that exists in an uplink transmission time interval after the downlink transmission time interval. A TTI with a length of 1 ms is used for an LTE system before Release 14. Both a length of an uplink TTI and a length of a downlink TTI are 1 ms, in other words, the length of the uplink TTI and the length of the downlink TTI each is a length of one subframe. A TTI with a shorter length is introduced in Release 14 and 5G New Radio (NR), and a base station device and a terminal device that support short TTI (sTTI) transmission can support a TTI with a length of 1 ms and an uplink sTTI/downlink sTTI with a length that is less than 1 ms. Supported available lengths of the sTTI include seven SC-FDMA symbols (SS), one SS, two SSs, three SSs, four SSs, and the like. In other words, one downlink subframe may include at least two downlink sTTIs, and one uplink subframe may include at least two uplink sTTIs. In this embodiment of the present disclosure, the downlink TTI may be a TTI with a length of 1 ms, that is, one subframe, or may be an sTTI with a length that is less than 1 ms, and the sTTI with a length that is less than 1 ms includes at least one downlink OFDM symbol. The uplink TTI may be a TTI with a length of 1 ms, that is, one subframe, or may be an sTTI with a length that is less than 1 ms, and the sTTI with a length that is less than 1 ms includes at least one uplink SC-FDMA symbol. It should be noted that, during specific implementation, one TTI with a length of 1 ms (that is, one subframe) or one sTTI with a length that is less than 1 ms each is referred to as one TTI, and a specific TTI may be determined based on a TTI format used by the base station device or the terminal device in an actual application scenario, and is not limited herein.

In some feasible implementations, the time domain resource indicated by the first control information sent by the base station device is a grantless resource (or referred to as a grantless time domain resource) described in this embodiment of the present disclosure. The grantless resource described in this embodiment of the present disclosure is used for grantless PUSCH transmission by the terminal device. The base station device may allocate one time domain resource and/or frequency domain resource to only one terminal device as a grantless resource, or may allocate a same time domain resource and/or frequency domain resource to at least two terminal devices as a grantless resource. For a grantless time domain resource, the terminal device may determine whether to use the time domain resource to send uplink data information, and determine to use which uplink TTI in the time domain resource to send the uplink data information. To be specific, when the grantless time domain resource includes at least two uplink TTIs, after receiving the first control information, the terminal device may send uplink data information in at least one uplink TTI in the time domain resource, or may occupy some uplink TTIs in the time domain resource, or may occupy all of the time domain resource. The time domain resource includes at least one TTI or subframe. Any one of the at least one TTI/subframe may be a complete TTI/subframe, or may be a partial TTI/subframe. In other words, the terminal device can send data information only on some time domain resources of the TTI/subframe. The time domain resource is after the first downlink TTI carrying the first control information, in other words, a first TTI or a first subframe in the time domain resource is after the first downlink TTI carrying the first control information.

In some feasible implementations, a time interval between the start time unit of the time domain resource and an end moment of the first downlink TTI (referred to as a downlink TTI) may be equal to 0, in other words, the start time unit of the time domain resource closely follows the downlink TTI. Alternatively, a time interval between the start time unit of the time domain resource and an end moment of the downlink TTI may be greater than 0, in other words, the time domain resource starts after a period of time subsequent to the end moment of the downlink TTI. When the time interval between the start time unit of the time domain resource and the end moment of the downlink TTI is greater than 0, the time interval may be used for LBT. Alternatively, in some implementations, data information may need to be transmitted in another downlink TTI after the downlink TTI, in other words, the downlink TTI is not a last downlink TTI of a downlink burst. In this case, the time domain resource needs to come after transmission of the data information to be transmitted in the another downlink TTI after the downlink TTI is completed. Alternatively, if the downlink TTI is included in a downlink end subframe, the base station device does not occupy all downlink symbols in the downlink end subframe, and in this case, the grantless time domain resource indicated by the first control information comes after the downlink end subframe ends.

In some feasible implementations, the first control information sent by the base station device may be user-specific control information, or may be user group-specific control information, or may be common control information. The user-specific control information is scrambled by using a user-specific radio network temporary identifier (RNTI), and can be detected only by a specific terminal device, and the control information is valid only for the specific terminal device. The user group-specific control information can be detected only by a specific group of terminal devices (at least two terminal devices), and the control information is valid only for a terminal device included in the group. The common control information is scrambled by using a cell-specific RNTI, and may be detected by all activated terminal devices included in a cell, and the common control information is valid for all terminal devices that can detect the common control information.

In some feasible implementations, when the first control information is common control signaling (namely, common control information), the first control information is used to indicate the grantless time domain resource, and an existing common control channel (Common PDCCH, CPDCCH) may be used for the first control information. The base station device may scramble the common control signaling by using a cell common RNTI (CC-RNTI). Alternatively, the base station device may scramble the common control signaling by using a new common control channel format or a new cell-specific RNTI. During specific implementation, the common control signaling may be carried in a PDCCH channel area. Further, considering that an original physical hybrid automatic repeat request indicator channel (PHICH) in the LTE system may not need to be received, for a HARQ indication, by a terminal device operating on an unlicensed spectrum or in Release 14, a physical resource corresponding to the idle PHICH may be used to carry the common control information to indicate the time domain resource to the terminal device.

S103. The terminal device determines a time domain resource based on the first control information.

In some feasible implementations, after receiving the first control information, the terminal device may determine the grantless time domain resource based on the first control information, including determining time domain resource parameters such as the start time unit of the time domain resource, the length (duration) of the time domain resource, and the end moment of the time domain resource. If the terminal device determines any two of the three time domain resource parameters, the terminal device can determine the third parameter. In other words, the terminal device can determine the time domain resource if the terminal device has determined two of the three time domain resource parameters. Specifically, the start time unit of the time domain resource is later than a target time unit, and a time interval between the target time unit and the start time unit is a first time interval.

Figure 4:
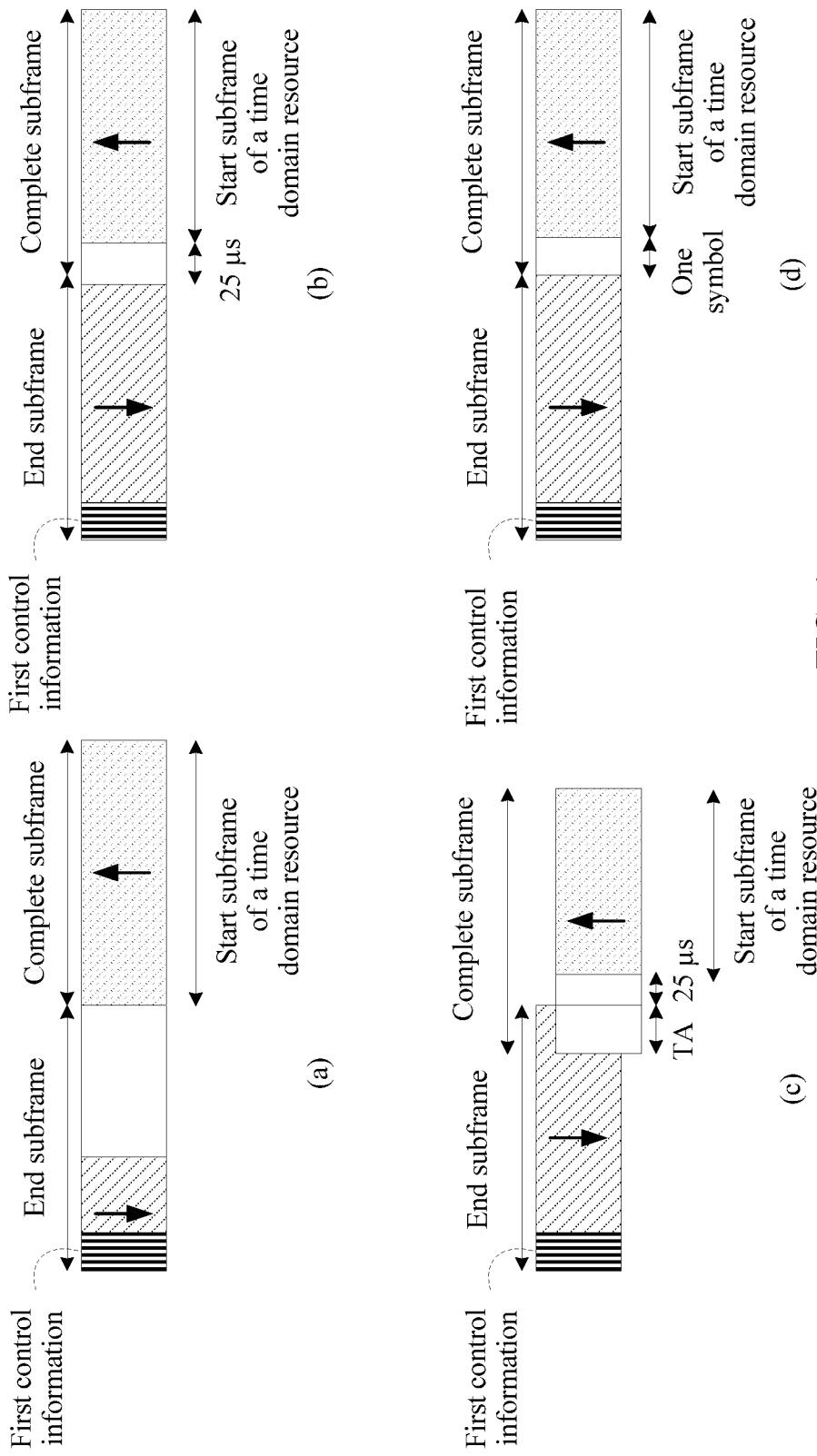
FIG. 4 is a schematic diagram of a time domain resource according to an embodiment of the present disclosure.

The start time unit includes an earliest transmission time interval in which the terminal device is allowed to send uplink data information on the time domain resource, namely, a first TTI (referred to as a start TTI) in at least one TTI included in the time domain resource or a first subframe (referred to as a start subframe) in at least one subframe included in the time domain resource. A start moment of the time domain resource is an earliest moment at which the terminal device is allowed to send data information on the time domain resource. The start moment includes the start subframe or the start TTI of the time domain resource, and/or a position (a start position) at which the terminal device is allowed to start to send data information in the start subframe/start TTI. The start time unit includes the start TTI or the start subframe of the time domain resource, and the start TTI/start subframe may be a complete TTI or a complete subframe, or may be a partial TTI or a partial subframe. For some start Ms/start subframes, the terminal device needs to occupy all time domains of a complete TTI/complete subframe to send data information. For some other start Ms/start subframes, the terminal device does not need to occupy all time domains of a complete TTI/complete subframe, but occupies only some time domains of the complete TTI/complete subframe to send data information. The time domains that the terminal device is allowed to occupy in the complete TTI/complete subframe are referred to as a partial TTI/partial subframe. A start boundary of the start time unit is a start position at which the terminal device starts to send data information in the start TTI/start subframe. Specifically, when the start TTI/start subframe is a complete TTI/subframe, a start position of the start TTI/start subframe is a start boundary of the TTI/subframe, and the start time unit is the start TTI/start subframe. Specifically, when the start TTI/start subframe is a partial TTI/partial subframe, a start position of the start TTI/start subframe is in a complete TTI/complete subframe (or between a start boundary and an end boundary of a complete TTI/complete subframe in which the start TTI/start subframe exists), and the start time unit may be the complete TTI/complete subframe, or may be a part from a start position of the complete TTI/complete subframe to an end boundary of the start TTI/start subframe. The start position is a moment at which the terminal device is allowed to start to send uplink data information in the start TTI/start subframe. For a licensed spectrum, the start TTI/start subframe is always a complete TTI/complete subframe, and the start position may be always a start boundary of the start TTI/start subframe (for example, a start boundary, referred to as 0 μs, of the complete subframe). For an unlicensed spectrum, optionally, the start TTI/start subframe may be a complete TTI/complete subframe, and the start position may be a start boundary (0 μs) of the start TTI/start subframe. In this case, the start time unit is a first complete TTI/complete subframe included in the time domain resource, as shown in (a) in FIG. 4. FIG. 4 is a schematic diagram of a time domain resource according to an embodiment of the present disclosure. Optionally, the start TTI/start subframe may be a partial TTI/partial subframe, and the start position may be in a complete TTI/complete subframe in which the start TTI/start subframe exists, and may be specifically in a first uplink symbol or at the beginning of a second uplink symbol. For example, when the time domain resource closely follows an end subframe of a downlink burst, and the end subframe occupies 14 symbols, the start position may be at the beginning of the second uplink symbol in the complete TTI/complete subframe (referred to as one symbol), as shown in (d) in FIG. 4. In this case, the start time unit may be a first complete TTI/complete subframe included in the time domain resource, or may be a part (a slant grid part) from the beginning of a second symbol in the first complete TTI/complete subframe to an end boundary of the subframe. Alternatively, the start position may be at 25 μs after a start boundary of a complete TTI/complete subframe (referred to as 25 μs), and in a first symbol, as shown in (b) in FIG. 4. In this case, the start time unit may be a first complete TTI/complete subframe included in the time domain resource, or may be a part (a slant grid part) from 25 μs in the first complete TTI/complete subframe to an end boundary of the subframe. Alternatively, the start position may be at 25 μs+TA (Timing Advance) after a start boundary of a complete TTI/complete subframe (referred to as 25 μs+TA), and in a first symbol, as shown in (c) in FIG. 4. In this case, the start time unit may be a first complete TTI/complete subframe included in the time domain resource, or may be a part (a slant grid part) from 25 μs+TA in the first complete TTI/complete subframe to an end boundary of the subframe. An idle gap of one symbol, 25 μs, or 25 μs+TA is reserved at a position in the front of a start subframe, for LBT on an uplink data channel.

The target time unit is the downlink transmission time interval (namely, the first downlink TTI) carrying the first control information, or the target time unit is a subframe in which the first downlink TTI exists, or the target time unit is a last subframe or a last TTI of a downlink burst, the downlink burst includes the target downlink TTI, and the downlink burst is at least one consecutive downlink TTI. The target time unit may be a complete TTI/subframe, or may be a partial TTI/subframe. When the base station device does not occupy all time domains of a complete TTI/ complete subframe, but occupies only some time domains to send downlink information, the time domains occupied by the base station device are referred to as a partial TTI/partial subframe.

The first time interval is a time interval between the target time unit and the start time unit. Optionally, the first time interval is a time interval between a start boundary or an end boundary of a complete TTI/complete subframe in which the target time unit exists and a start position corresponding to the start time unit. For example, the target time unit is a last subframe of the downlink burst, namely, an end subframe. A time domain range occupied by the base station in the end subframe is from a first symbol (referred to as symbol #1) to a third symbol (referred to as symbol #3). The start time unit is a first complete subframe after the end subframe, and the start position is a subframe boundary. In this case, the first time interval is a time interval between a start boundary of the end subframe and the start position corresponding to the start time unit, that is, one subframe. Alternatively, the first time interval is a time interval between an end boundary of the end subframe and a start position corresponding to the start time unit, that is, 0.

The first time interval is a time interval between the target time unit and the start time unit. Optionally, the first time interval is a time interval between a start boundary or an end boundary of a complete TTI/complete subframe in which the target time unit exists and a start boundary of a complete TTI/complete subframe in which the start time unit exists. For example, the target time unit is a last subframe of the downlink burst, namely, an end subframe. The base station occupies all symbols in the end subframe. The start time unit is a first subframe after the end subframe, and a start position is at the beginning of a second symbol in the subframe (one symbol). In this case, the first time interval is a time interval between a start boundary of the end subframe and the start position corresponding to the start time unit, that is, one subframe and one symbol, or the first time interval is a time interval between an end boundary of the end subframe and the start position corresponding to the start time unit, that is, one symbol.

The end moment includes a latest moment at which the terminal device is allowed to send data information on the time domain resource, and the end moment includes a last subframe or a last TTI (referred to as an end time unit) included in the time domain resource, and/or a position (end position) at which the terminal device is allowed to stop sending data information in the last subframe/last TTI. The last subframe/last TTI may be a complete subframe/complete TTI, or may be a partial subframe/partial TTI. The end position may be a start boundary or an end boundary of a complete subframe/complete TTI in which the last subframe/last TTI included in the time domain resource exists, or may be in a complete subframe/complete TTI in which the last subframe/last TTI exists.

The duration of the time domain resource is a time length between the start moment and the end moment. Specifically, the duration may be a time length between the start time unit of the time domain resource or the complete TTI/complete subframe in which the start time unit exists and the end time unit (or a complete TTI/complete subframe in which the end time unit exists), or may be a time length between the start position corresponding to the start time unit and an end position corresponding to the end time unit. This embodiment of the present disclosure describes how the terminal device obtains the duration and the start moment of the time domain resource, and the method is also applicable to a case in which the terminal device obtains the duration and the end moment of the time domain resource or obtains the start moment and the end moment of the time domain resource.

In some feasible implementations, the base station device may notify the terminal device of the duration of the grantless time domain resource by using the first control information, and the terminal device may directly determine the duration of the time domain resource based on the first control information. It should be noted that, that the base station device indicates the duration of the time domain resource by using the first control information may be reflected by indicating a quantity of uplink TTIs, or may be reflected by indicating a quantity of uplink subframes, or may be reflected by indicating a quantity of milliseconds. The terminal device may determine the duration of the time domain resource based on the indication of the first control information, and the operation is simple. During specific implementation, when the first control information is a CPDCCH, the base station device may introduce a new bit field in the CPDCCH to explicitly indicate the duration of the time domain resource. It should be understood that the time domain resource is continuous, and the time domain resource includes consecutive TTIs or subframes. The consecutive TTIs or subframes may mean that two adjacent TTIs or subframes are continuous, or may mean that there is an idle gap (for example, an idle gap of one symbol or some symbols) between two adjacent TTIs or subframes, and the idle gap is used to perform LBT.

Similarly, the base station device may also indicate the end moment of the grantless time domain resource to the terminal device by using the first control information. In this notification manner in which the base station device indicates the grantless time domain resource by using the first control information, the base station device can dynamically notify the terminal device of the duration of the grantless time domain resource at the cost of increasing notification signaling overheads. For example, when an uplink/downlink TTI is a TTI with a length of 1 ms (that is, one subframe), a UL grant scheduling delay is 4 ms, and a length of a downlink burst sent by the base station on the unlicensed spectrum is one subframe, an idle gap between a DL and a UL (a time between an end subframe of the downlink burst and an earliest uplink subframe scheduled by using a UL grant included in the downlink burst) is 3 ms. After 3 ms, the base station device may schedule an uplink data channel by using the UL grant, and therefore the duration of the grantless time domain resource may be indicated as 3 ms. Likewise, when a length of a downlink burst sent by the base station device on the unlicensed spectrum is two subframes, an idle gap between a DL and a UL is 2 ms, and the duration of the grantless time domain resource may be indicated as 2 ms.

In some feasible implementations, the base station device may notify the terminal device of the duration of the grantless time domain resource by using first higher layer signaling. The terminal device receives the first higher layer signaling before receiving the first control information, and configures the duration of the time domain resource by using the first higher layer signaling. The base station device configures the duration of the grantless time domain resource by using the first higher layer signaling, so that signaling overheads can be reduced. The first control information is only used to indicate the grantless time domain resource. Specifically, for the unlicensed spectrum, a new control signaling bit field does not need to be introduced additionally. Similar to the foregoing implementation, the terminal device is triggered, by detecting existence of the first control information, to send uplink data information. Specifically, when the first control information is a CPDCCH, because the CPDCCH indicates that a current subframe or a next subframe is an end subframe, when the terminal device detects the CPDCCH, if the start time unit is a first subframe that closely follows the end subframe, the terminal device may determine that x subframes that closely follow the end subframe are the grantless time domain resource, and x is the configured duration of the time domain resource. This notification manner is also applicable to a scenario in which the first control information is user-specific control information or user group-specific control information.

Optionally, the duration of the grantless time domain resource provided in this embodiment of the present disclosure may be predefined. For example, the duration of the grantless time domain resource may be predefined as two subframes or two TTIs, three subframes or three TTIs, or the like. Specific duration may be determined based on an actual application scenario, and is not limited herein.

Optionally, during determining the duration of the time domain resource, the terminal device may directly determine that the duration of the time domain resource is duration configured by using the first higher layer signaling, predefined duration, or duration indicated by the base station device by using the first control information. Alternatively, the terminal device determines that the end moment of the time domain resource is obtained by adding the start moment of the time domain resource to the duration of the time domain resource. For example, when the start moment is a first subframe, denoted as subframe # m+1, that closely follows the end subframe of the downlink burst, and the duration is x subframes, the end moment is subframe # m+x, and the time domain resource is x subframes that closely follow the end subframe. In other words, the duration configured by using the first higher layer signaling, the predefined duration, or the duration indicated by the base station device by using the first control information corresponds to the time length between the start moment and the end moment, and is equal to actual duration of the time domain resource.

Optionally, during determining the duration of the time domain resource, the terminal device may determine that the duration of the time domain resource is obtained by subtracting the first time interval from duration configured by using the first higher layer signaling, predefined duration, or duration indicated by the base station device by using the first control information. Alternatively, the terminal device determines that the end moment of the time domain resource is obtained by adding an end moment of the target time unit (or a first TTI after the target time unit) to the duration of the time domain resource. In this manner, because the target time unit is fixed, the end moment that is of the time domain resource and that is determined by the terminal device is not related to the first time interval but related only to the duration. The base station may not need to dynamically indicate the first time interval, but uses a predefined manner or a higher layer signaling configuration manner. Therefore, this manner may also be considered as a manner of determining the end moment of the time domain resource, and the end moment is configured by using the first higher layer signaling, predefined, or indicated by the base station device by using the first control information. For example, it is assumed that the first time interval is a time interval between an end boundary of the end subframe and the start position corresponding to the start time unit. When the target time unit is the end subframe of the downlink burst, the start moment is a first subframe, denoted as subframe # m+1, that closely follows the end subframe, and the configured or predefined or indicated duration is x subframes, the first time interval is 0, the end moment is subframe # m+x, and the time domain resource is x subframes that closely follow the end subframe. When the start moment is a second subframe, denoted as subframe # m+2, that closely follows the end subframe, and the configured or predefined or indicated duration is x subframes, the first time interval is one subframe, the end moment is still subframe # m+x, and the time domain resource is x−1 subframes starting from subframe # m+2.

In some feasible implementations, the base station device may trigger, by using the first control information, the terminal device to send or not to send grantless uplink data information.

Optionally, triggering information may be an independent bit in the first control information, or may be encoded together with information used to indicate the duration of the grantless time domain resource, and the triggering information is used to trigger one of two states in which the terminal device is to send and is not to send grantless uplink data information. When the first control information is used for triggering by using an independent bit, an independent bit included in the first control information may be used for triggering. Specifically, if the independent bit is "o", it indicates that the terminal device is not to be triggered to send uplink data information. If the independent bit is "1", it indicates that the terminal device is to be triggered to send uplink data information. Specifically, the terminal device is triggered to send grantless uplink data information in at least one of x subframes/TTIs that closely follow the target time unit, or the terminal device is triggered to send grantless uplink data information in at least one of x subframes/TTIs starting from the start time unit, where x is indicated by the first control information, in other words, the first control information indicates the length of the grantless time domain resource, or x is predefined, or is configured by using the first higher layer signaling sent by the base station. The start time unit is determined by adding the target time unit to the first time interval, and the first time interval is indicated by the first control information, or the first time interval is predefined, or is configured by using second higher layer signaling sent by the base station.

Optionally, the terminal device may be triggered by detecting the existence of the first control information. Specifically, when the first control information is a CPDCCH, the terminal device may determine the target time unit based on the detected CPDCCH. Specifically, the terminal device determines, based on the detected CPDCCH, that the current subframe or the next subframe is the end subframe. If the start time unit is a first subframe/TTI that follows the end subframe, when detecting the CPDCCH, the terminal device may send grantless uplink data information in at least one of x subframes/TTIs that closely follow the target time unit, or the terminal device sends grantless uplink data information in at least one of x subframes/TTIs starting from the start time unit, where x is indicated by the first control information, in other words, the first control information indicates the length of the grantless time domain resource, or x is predefined, or is configured by using the first higher layer signaling sent by the base station. The start time unit is determined by adding the target time unit to the first time interval, and the first time interval is indicated by the first control information, or the first time interval is predefined, or is configured by using second higher layer signaling sent by the base station.

Further, triggering information may be encoded together with information used to indicate the duration of the grantless time domain resource. For example, the first control information may include a 2-bit bit field, and the 2-bit bit field is encoded to obtain four statuses including "00", "01", "10", and "ii". The four statuses may respectively indicate that the duration of the time domain resource is 0, 1, 2, and 3, where 1, 2, and 3 respectively correspond to cases in which the duration of the time domain resource is one, two, and three uplink Ms/uplink subframes. When the base station device indicates that the duration of the grantless time domain resource is equal to 0, after receiving the first control information, the terminal device may determine that no grantless time domain resource is indicated, or the terminal device is not to be triggered to send a grantless data channel, and therefore the terminal device is not to send grantless uplink data information.

It should be noted that downlink control information is scrambled by using a cell-specific RNTI (for example, a CC-RNTI) or a user-specific RNTI, and the downlink control information includes a cyclic redundancy check (CRC) bit field in addition to a bit field of valid control information. The terminal device performs blind detection on a control channel area of a downlink subframe or a downlink TTI by using a cell-specific RNTI or a user-specific RNTI, and checks the CRC bit field. If CRC check succeeds, the terminal device determines that the downlink control information exists. Further, the downlink control information includes indication information for the terminal device. This notification manner is also applicable to a scenario in which the first control information is user-specific control information or user group-specific control information. Details are not described herein.

In some feasible implementations, after receiving the first control information, the terminal device may determine the start time unit of the grantless time domain resource based on the first control information. During specific implementation, the terminal device may determine the start time unit of the grantless time domain resource in the following four manners: predefining the start time unit, indicating the start time unit by using the second higher layer signaling, explicitly indicating the start time unit by using the first control information, and implicitly indicating the start time unit by using the first control information.

It should be noted that the determining the start time unit of the grantless time domain resource by the terminal device includes determining a start subframe/start TTI of the grantless time domain resource and also includes determining a start position corresponding to the start subframe/start TTI.

It should be noted that because the start time unit of the grantless time domain resource is dynamic, the terminal device may determine the start time unit of the grantless time domain resource based on the target time unit, and the time interval between the start time unit and the target time unit, namely, the first time interval, or an offset of the start time unit relative to the target time unit. In other words, the start time unit is obtained by adding the target time unit to the first time interval. The target time unit may be determined by the terminal device based on the detected first control information, and may be a TTI (denoted as a target TTI) or a subframe (denoted as a target subframe).

Figure 5:
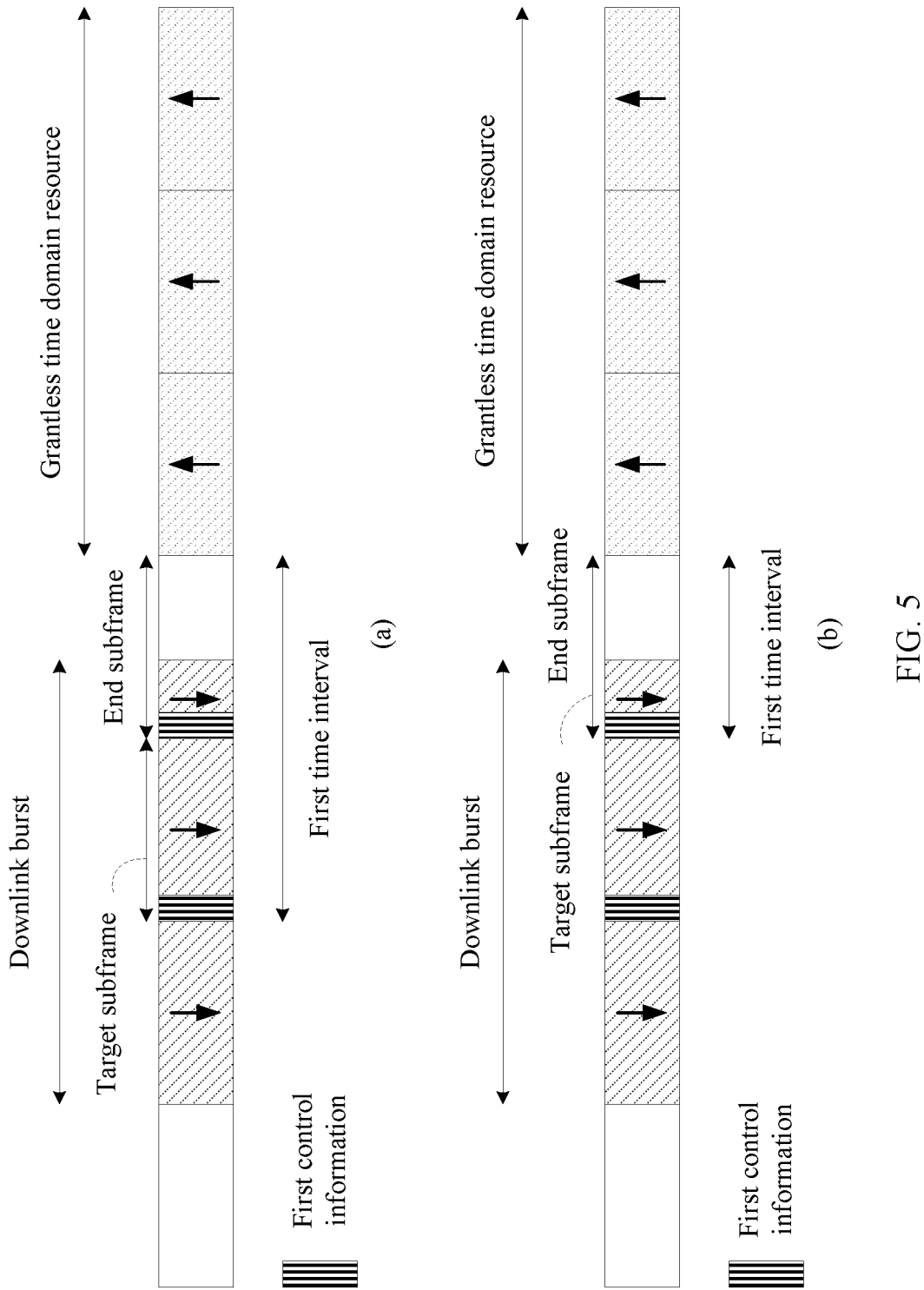
FIG. 5 is another schematic diagram of a time domain resource according to an embodiment of the present disclosure.

The terminal device may determine the target time unit based on the first control information. Optionally, the target time unit may be obtained by detecting the existence of the first control information. Specifically, a target TTI/target subframe is a downlink TTI or subframe (namely, the first downlink TTI) carrying the first control information, or a subframe in which the downlink TTI exists (if the TTI is an sTTI). The terminal device performs monitoring or blind detection on the first control information, and if the terminal device has detected the first control information in a downlink TTI/subframe, the downlink TTI/subframe is the target TTI/target subframe. A definition manner of the target TTI/target subframe is applicable to the licensed spectrum and the unlicensed spectrum. Further, in some feasible implementations, for the unlicensed spectrum, the CPDCCH may exist only in the end subframe, or may exist in the end subframe and a downlink subframe preceding the end subframe. For example, referring to FIG. 5, FIG. 5 is another schematic diagram of a time domain resource according to an embodiment of the present disclosure. When the first control information CPDCCH exists in the end subframe and the downlink subframe preceding the end subframe, if the duration and/or the start time unit of the time domain resource are or is indicated by the first control information, the target subframe (namely, the target time unit) may be the downlink subframe preceding the end subframe, as shown in (a) in FIG. 5, or may be the end subframe, as shown in (b) in FIG. 5. In two cases shown in (a) and (b) in FIG. 5, lengths of corresponding first time intervals are also different because the target subframe is differently defined.

The terminal device may determine the target time unit based on the first control information. Optionally, the target time unit may be indicated by the first control information. Specifically, a target TTI/target subframe may be a last subframe or a last TTI of a downlink burst carrying the first control information, and may exist only in the last subframe/last TTI, or may exist in the last subframe/last TTI and a subframe/TTI preceding the last subframe/last TTI. Therefore, the target TTI/target subframe possibly cannot be accurately determined only by detecting the existence. This definition manner is applicable to the unlicensed spectrum, and the terminal device may determine, by detecting different statuses of an existing bit field in the first control information, which subframe is the end subframe, and further determine that the target subframe is the end subframe. For example, when the first control information is a CPDCCH, an existing CPDCCH includes 4-bit control information "Subframe configuration for LAA" used to indicate a quantity of symbols occupied by the base station in the current subframe/next subframe. Because the CPDCCH can exist only in the end subframe and a subframe preceding the end subframe, and indication statuses of bit fields included in the two subframes are different, after detecting the CPDCCH in a subframe, the terminal device may determine whether the subframe is the end subframe or a next subframe is the end subframe. This notification manner is also applicable to a scenario in which the first control information is user-specific control information or user group-specific control information.

It should be noted that the downlink burst provided in this embodiment of the present disclosure is consecutive downlink transmission time intervals (consecutive downlink subframes or downlink TTIs) in which the base station occupies a channel to perform sending, and two adjacent downlink bursts are discontinuous. In the downlink burst in which the first control information exists, data information (a downlink data channel PDSCH) may exist, or data information may not exist. In other words, only a PDCCH is sent but no PDSCH is sent in the downlink burst, or the base station device sends only a UL grant. If the downlink burst includes at least one subframe, the subframe may be a complete subframe (that is, 14 symbols) or a partial subframe (less than 14 symbols), and the partial subframe includes an initial partial subframe, or an end partial subframe.

In some feasible implementations, four methods in which the terminal device determines the start time unit of the grantless time domain resource or the first time interval are specifically as follows.

Manner 1: The first time interval is a predefined time interval.

In some feasible implementations, the terminal device may determine the start time unit of the grantless time domain resource based on the determined target time unit and the predefined first time interval. For example, the terminal device may determine, as the target subframe by detecting the existence of the first control information (in other words, whether the first control information exists), a subframe in which the first control information is detected, and determine a subframe after the target subframe as the start subframe of the grantless time domain resource, where an interval between the subframe after the target subframe and the target subframe is the first time interval. Optionally, the terminal device may determine the start time unit of the grantless time domain resource based on the predefined first time interval and information that is included in the first control information and that is used to indicate the target subframe/target TTI. For example, when the first control information is a CPDCCH, and the CPDCCH may exist in two subframes (the end subframe and the subframe preceding the end subframe), the terminal device may determine the end subframe of the downlink burst based on an indication status of a bit field "Subframe configuration for LAA" included in the CPDCCH, determine that the end subframe is the target subframe, and determine a subframe after the target subframe as the start subframe of the grantless time domain resource, where an interval between the subframe after the target subframe and the target subframe is the first time interval. For example, when the predefined first time interval is one subframe, the terminal device determines, as the start subframe (namely, the start time unit of the time domain resource), a first subframe that closely follows the end subframe. This notification manner is also applicable to a scenario in which the first control information is user-specific control information or user group-specific control information.

Manner 2: The first time interval is configured by using the second higher layer signaling sent by the base station device.

In some feasible implementations, when the first time interval is configured by using the second higher layer signaling sent by the base station device, a method in which the terminal device determines the start time unit of the grantless time domain resource is similar to that in Manner 1, and the start subframe also needs to be determined based on the determined target subframe. The target subframe may be determined by detecting the existence of the first control information, or may be determined by using information that is in the first control information and that is used to indicate the target subframe/target TTI, and details are not described again. A difference between Manner 1 and Manner 2 is that in Manner 2, the first time interval is configured based on the higher layer signaling sent by the base station device, and this makes it more flexible to determine the start time unit of the time domain resource.

Manner 3: The first time interval or the start time unit is indicated by the first control information.

In some feasible implementations, the first time interval or the start time unit may be indicated by using a bit field included in the first control information. Further, when the first control information is used to indicate the first time interval, a manner in which the terminal device determines the start moment based on the target subframe and the first time interval is similar to those in Manner 1 and Manner 2, and details are not described herein again.

In some feasible implementations, when the first control information is used to indicate the duration of the time domain resource in addition to the first time interval or the start time unit, two independent bit fields may be used in the first control information to respectively indicate the duration and the start time unit (or the first time interval) of the time domain resource (Manner 3-1), or one bit field may be used in the first control information to jointly indicate the duration and the start time unit (or the first time interval) of the time domain resource (Manner 3-2).

Manner 3-1: Two independent bit fields are used to respectively independently indicate the duration and the start time unit (or the first time interval) of the time domain resource.

In some feasible implementations, in the first control information, a bit field used to indicate the start time unit of the time domain resource is independent of a bit field used to indicate the duration of the time domain resource. To be specific, for either the duration or the start time unit of the time domain resource, the terminal device may obtain, by traversing all statuses of a corresponding bit field in the first control information, all indication content included in the first control information. All statuses of the start time unit of the time domain resource may be combined with all statuses of the length of the time domain resource at random. For example, when the first control information is a CPDCCH, the CPDCCH includes 1-bit information used to indicate the start time unit (or the first time interval). In two statuses included in the information, a state "0" indicates that the first time interval between the start subframe of the time domain resource and the end subframe of the downlink burst is one subframe (the start subframe is a first subframe that closely follows the end subframe), and a state "1" indicates that the first time interval between the start subframe of the time domain resource and the end subframe of the downlink burst is two subframes (the start subframe is a second subframe after the end subframe). In addition, the CPDCCH further includes another 2-bit bit field used to indicate the length of the time domain resource, and four statuses obtained by encoding the 2-bit field may respectively indicate that the duration of the time domain resource is zero, one, two, and three subframes. The terminal device may determine that the time domain resource includes time domain ranges of zero, one, two, and three subframes starting from the start subframe or the target subframe. All possible start positions of the time domain resource may be obtained by traversing the 1-bit information that indicates the start time unit (or the first time interval), and all possible lengths of the time domain resource may be obtained by traversing the 2-bit information. The two statuses of the start time unit of the time domain resource may be combined with the four statuses of the length of the time domain resource at random, and the combination may be indicated by using bit information in the CPDCCH. This notification manner is also applicable to a scenario in which the first control information is user-specific control information or user group-specific control information.

Manner 3-2: One bit field is used to jointly indicate the duration and the start time unit (or the first time interval) of the time domain resource. In the first control information, one bit field is used to jointly indicate the start time unit of the time domain resource and the length of the time domain resource. To be specific, for at least one of the duration and the start time unit of the time domain resource, all bits in the entire bit field are used to indicate valid statuses of the length and the start time unit of the time domain resource, and only some selected bits cannot indicate valid information of the length or the start time unit of the time domain resource.

In some feasible implementations, redundancy may occur when two pieces of indication information are independently used for indication. For example, when the length of the time domain resource is 0, any status of the first time interval corresponds to one user behavior, and it is considered that the time domain resource is empty. When the length of the time domain resource is 3, the time interval (namely, the first time interval) between the start subframe of the time domain resource and the end subframe of the downlink burst can only be one subframe (a subframe at a difference of a time interval greater than 4 from the end subframe can be scheduled, and does not need to be indicated as a grantless resource). Therefore, some indication statues can be reduced. For example, available lengths are zero, one, two, and three subframes, and available first time intervals are zero and one subframe, as shown in Table 1. Table 1 is a schematic table of the joint indication corresponding to Manner 3-2.

TABLE 1

| Bit field | Length (quantity of subframes) | First time interval (quantity of subframes) |
| --- | --- | --- |
| 000 | 0 | Unavailable |
| 001 | 1 | 1 |
| 010 | 1 | 2 |
| 011 | 2 | 1 |
| 100 | 2 | 2 |
| 101 | 3 | 1 |
| 110 | Unavailable | Unavailable |
| 111 | Unavailable | Unavailable |

"Unavailable" shown in Table 1 indicates that no time resource exists (the terminal device is instructed not to send grantless uplink information), "1" indicates that the first time interval is one subframe, and "2" indicates that the first time interval is two subframes. The same is true of an indication manner of the length, and details are not described again.

In addition, another advantage of jointly indicating the length and the start time unit of the time domain resource is that a discontinuous time domain resource can be indicated. For example, M subframes/TTIs correspond to M bits through bit mapping. For example, a maximum of three subframes after the first control information may be indicated as a grantless time domain resource (a subframe at a difference of a time interval greater than 4 from the end subframe can be scheduled), and a bit mapping manner of 3 bits is shown in Table 2. Table 2 is another schematic table of the joint indication corresponding to Manner 3-2. "Available" indicates that the time domain resource includes the subframe, and "unavailable" indicates that the time domain resource does not include the subframe. A bit state "001" indicates that the first time interval between the start subframe of the time domain resource and the end subframe of the downlink burst is three subframes (including subframe # n, subframe # n+1, subframe # n+2, and subframe # n+3), in other words, a fourth subframe (subframe # n+3) is available. Bit states "010" and "011" indicate that the first time interval is two subframes (including subframe # n and subframe # n+1), in other words, a third subframe (subframe # n+2) and the fourth subframe (subframe # n+3) are available. Likewise, bit states "100", "101", "110", and "111" indicate that the first time interval is one subframe.

TABLE 2

| Bit field | Subframe #n + 1 | Subframe #n + 2 | Subframe #n + 3 |
| --- | --- | --- | --- |
| 000 | Unavailable | Unavailable | Unavailable |
| 001 | Unavailable | Unavailable | Available |
| 010 | Unavailable | Available | Unavailable |
| 011 | Unavailable | Available | Available |
| 100 | Available | Unavailable | Unavailable |
| 101 | Available | Unavailable | Available |
| 110 | Available | Available | Unavailable |
| 111 | Available | Available | Available |

Manner 4: The first time interval or the start time unit is implicitly indicated by the first control information.

In some feasible implementations, the first time interval or the start time unit of the grantless time domain resource may be determined based on indication information included in the first control information. The indication information may include a quantity of symbols occupied by the base station device in the last subframe (or the end subframe) or the last TTI of the downlink burst carrying the first control information. Alternatively, the indication information may be used to indicate a quantity of symbols occupied by the base station device in the current subframe/next subframe or a current TTI/next TTI. An issue to be considered for selection of the start time unit of the grantless time domain resource or the first time interval is to reserve a corresponding idle gap for a PUSCH to be transmitted on the time domain resource, to perform LBT. Because the time domain resource described in this embodiment of the present disclosure comes after the end subframe of the downlink burst, it is mainly considered whether the end subframe includes an idle gap. If the base station device does not occupy all downlink symbols in the end subframe, in other words, the end subframe includes an idle gap, the start time unit of the time domain resource may be a first subframe that closely follows the end subframe, to improve time domain resource utilization. If the base station device occupies all the downlink symbols in the end subframe, the start time unit moment of the time domain resource needs to be after a start boundary of a first subframe after the end subframe, for example, a middle symbol of the first subframe or a second subframe after the end subframe, to reserve an idle gap between the end subframe and the start time unit of the time domain resource to perform LBT.

It should be noted that considering that on the unlicensed spectrum, common control signaling has been used to indicate the end subframe and a quantity of symbols occupied by the base station device in the end subframe, the terminal device may determine the start subframe based on the quantity of symbols occupied by the base station device in the end subframe. If the terminal device determines that the base station device does not occupy all the downlink symbols in the end subframe, the terminal device may determine that the first time interval between the start subframe of the time domain resource and the end subframe of the downlink burst is one subframe (the start subframe is a first subframe that closely follows the end subframe). If the terminal device determines that the base station device occupies all the downlink symbols in the end subframe, the first time interval between the start subframe of the time domain resource and the end subframe of the downlink burst is greater than one subframe, including the start subframe is a second subframe that closely follows the end subframe, or the start subframe is a first subframe that closely follows that end subframe, and a start position corresponding to the start subframe is in a complete subframe in which the start subframe exists. For example, when the first control information is a CPDCCH, no new bit needs to be additionally added to an existing CPDCCH to indicate the start time unit (or the first time interval) of the time domain resource, and 4-bit control information (Subframe configuration for LAA) that is in the existing CPDCCH and that is used to indicate a quantity of symbols occupied by the base station device in the current subframe/next subframe may be reused.

Figure 6:
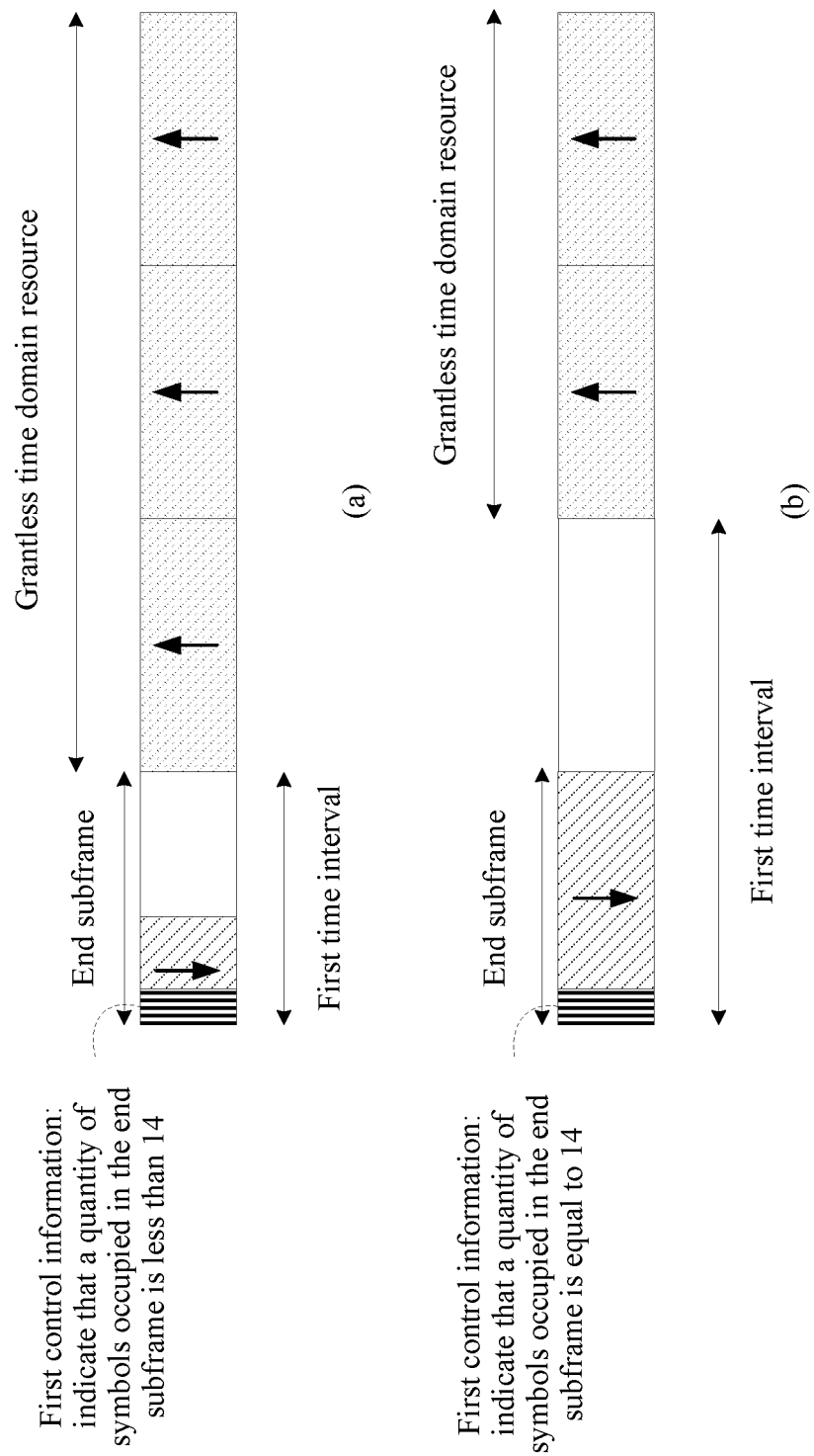
FIG. 6 is another schematic diagram of a time domain resource according to an embodiment of the present disclosure.

In some feasible implementations, the first control information is not only used to indicate a quantity of symbols occupied in the current subframe and indicate which subframe is the end subframe, but may also be used to implicitly indicate the start time unit of the time domain resource or the first time interval. When the first control information indicates that a quantity of symbols occupied in the end subframe is 14 or all symbols in the end subframe are occupied, the first time interval between the start subframe of the time domain resource and the end subframe of the downlink burst is two subframes. For example, as shown in (b) in FIG. 6, FIG. 6 is another schematic diagram of a time domain resource according to an embodiment of the present disclosure. The start subframe of the time domain resource is a second subframe after the end subframe of the downlink burst. A subframe in an idle gap between the start subframe of the time domain resource and the end subframe of the downlink burst is used by the terminal device to perform LBT on an uplink data channel. When a quantity of symbols occupied in the end subframe is less than 14 or not all symbols in the end subframe are occupied, for example, as shown in (a) in FIG. 6, the first time interval is one subframe, in other words, the start subframe of the time domain resource is a first subframe that closely follows the end subframe. In this application scenario, the terminal device may perform LBT in an idle gap in the end subframe, and there is no need to reserve an idle gap of one subframe between the start subframe of the time domain resource and the end subframe of the downlink burst. This notification manner is also applicable to a scenario in which the first control information is user-specific control information or user group-specific control information.

Further, in some feasible implementations, after determining the start subframe/start TTI of the time domain resource, the terminal device may further determine the start position corresponding to the start subframe/start TTI. Similarly, the start position may be predefined (Manner a). For example, the start position of the start subframe/start TTI is always at 0 μs at the start boundary of the complete TTI/complete subframe in which the start subframe/start TTI exists (a position 1), or at 25 μs after the start boundary of the complete TTI/complete subframe in which the start subframe/start TTI exists (a position 2), or at 25 μs+TA after the start boundary of the complete TTI/complete subframe in which the start subframe/start TTI exists (a position 3), or at the beginning of the second uplink symbol in the complete TTI/complete subframe in which the start subframe/start TTI exists (one symbol) (a position 4). Alternatively, the start position may be configured by using higher layer signaling sent by the base station device (Manner b). In Manner b, available positions of the start position include the four positions described above, the position 1 to the position 4, and details are not described again. Alternatively, the start position may be explicitly indicated by the first control information sent by the base station device (Manner c). In Manner c, available positions of the start position include the four positions described above, the position 1 to the position 4, and details are not described herein again. Alternatively, the start position may be implicitly indicated by a bit field that is included in the first control information sent by the base station device and that is used to indicate the quantity of symbols occupied in the end subframe of the downlink burst (Manner d). In Manner d, when the quantity of symbols occupied in the end subframe is 14 or all the symbols in the end subframe are occupied, the start position is at 25 μs or one symbol or 25 μs+TA (the positions 2 to 4). When the quantity of symbols occupied in the end subframe is less than 14 or not all the symbols in the end subframe are occupied, the start position is at 0 μs (the position 1).

It should be noted that a manner in which the terminal device determines the start subframe/start TTI is independent of a manner in which the terminal device determines the start position, and any manner of determining the start subframe/start TTI is combined with any manner of determining the start position. When the start position is not at 0 μs, the terminal device may perform rate matching on the start subframe/start TTI, or directly puncture a time domain signal between the start subframe/start TTI and the start position, for example, a time domain signal corresponding to 25 μs, 25 μs+TA, or one symbol. For example, the terminal device determines the start subframe/start TTI in a predefined manner or a higher layer signaling configuration manner (Manner a or Manner b), and determines the start position through explicit indication or implicit indication by using the first control information (Manner c or Manner d). Alternatively, the terminal device determines the start subframe/start TTI through explicit indication or implicit indication by using the first control information (Manner c or Manner d), and determines the start position in a predefined manner or a higher layer signaling configuration manner (Manner a or Manner b).

It should be noted that, in this embodiment of the present disclosure, the grantless time domain resource is dynamically indicated by the first control information, and although a time domain resource is also dynamically indicated by UL grant information in scheduling based (English: UL grant based) uplink transmission, a difference from an uplink channel scheduled by using a UL grant is that, in this embodiment of the present disclosure, a nearer time domain resource is indicated in a grantless manner, or the first time interval (or an interval between a downlink TTI in which the first control information exists and the start time unit of the grantless time domain resource indicated by the first control information) is shorter than a minimum scheduling delay of the UL grant based scheduling manner. The minimum scheduling delay of UL grant based scheduling is a time interval between a downlink TTI/downlink subframe in which the UL grant exists and an uplink TTI/uplink subframe corresponding to an earliest uplink channel that may be scheduled by using the UL grant. The minimum scheduling delay may be a second time interval provided in this embodiment of the present disclosure. The first downlink TTI may be a TTI carrying the UL grant, the uplink TTI corresponding to the earliest uplink channel scheduled by using the UL grant may be set as a target uplink TTI, and the second time interval is a time interval between the first downlink TTI and the target uplink TTI.

In this embodiment of the present disclosure, the time interval between the first downlink TTI and the start time unit of the grantless time domain resource is less than the second time interval, so that resource utilization can be improved, and uplink data transmission efficiency can be improved. It should be noted that if there is more than one uplink channel scheduled by using the UL grant, or a plurality of scheduled uplink channels exist in a plurality of uplink TTIs, the target uplink TTI corresponds to an earliest uplink channel in these uplink channels. For example, a minimum scheduling delay (namely, a second time interval) between a PUSCH scheduled by using a UL grant and a subframe/TTI in which the UL grant exists is four subframes/TTIs. In this embodiment of the present disclosure, the first time interval between the subframe/TTI in which the first control information exists and the start time unit of the time domain resource may be equal to one subframe/TTI, two subframes/TTIs, or three subframes/TTIs. It should be understood that the minimum scheduling delay in this embodiment is not specific to a nearest uplink channel scheduled by using a UL grant in a specific scheduling process, but specific to a capability of a nearest uplink channel that can be scheduled by the base station device. For example, if a nearest PUSCH scheduled by using a UL grant sent by the base station device in subframe # n exists in subframe # n+5 at a time, but a capability of a nearest PUSCH that can be scheduled by the base station device is a PUSCH, in subframe # n+4, that is scheduled by using a UL grant in subframe # n, and the PUSCH in subframe # n+4 can be scheduled in another scheduling process, and in this case, the minimum scheduling delay is four subframes. Unlike in scheduling based uplink transmission, the terminal device does not start to perform packet encapsulation on an uplink channel only after receiving the UL grant, but instead, the terminal device performs packet encapsulation in advance. For example, the terminal device may perform packet encapsulation any time after the terminal device has an uplink service, and the terminal device may immediately send a PUSCH after detecting the first control information.

It should be noted that the UL grant is used to schedule an uplink channel and indicate a transport format of the uplink channel, and the uplink channel may be an uplink service channel (PUSCH) or an uplink control channel (in the Multefire standard, an extended uplink control channel (ePUCCH)) may also be scheduled by using the UL grant).

The transport format that is of the uplink channel and that is indicated by the UL grant includes at least one of the following, including a time domain resource occupied by the uplink channel, a frequency domain resource occupied by the uplink channel, a modulation and coding scheme of the uplink channel, and a time interval between a downlink TTI/subframe in which the UL grant exists and the uplink channel scheduled by using the UL grant.

The time domain resource occupied by the uplink channel includes at least one TTI.

Considering that a UL grant may be used to schedule at least two TTIs, duration of a time domain resource may be determined based on a quantity of TTIs scheduled by using the UL grant. A time interval between a downlink TTI/subframe in which the UL grant exists and a scheduled uplink channel includes a time interval between a TTI carrying the UL grant and a TTI carrying the uplink channel (or a first TTI in the at least two TTIs scheduled by using the UL grant), or a UL grant scheduling delay. Considering that the time interval between the downlink TTI/subframe in which the UL grant exists and the uplink channel scheduled by using the UL grant may be greater than a minimum scheduling delay, the UL grant may include control information indicating the scheduling delay. A frequency domain resource occupied by the uplink channel indicated by the UL grant includes at least one physical resource block (PRB).

It should be noted that, the scheduling delay is a time interval between the downlink TTI/downlink subframe carrying the UL grant sent by the base station device and an uplink TTI/uplink subframe carrying the uplink data channel that is scheduled by using the UL grant and that is sent by the terminal device. Considering a detection capability and a packet encapsulation capability of the terminal device, there is a requirement of a minimum scheduling delay between the scheduling based uplink data channel and the UL grant, and the base station device may schedule an uplink TTI/uplink subframe later than the minimum scheduling delay. For example, when the minimum scheduling delay is 4 ms, only an uplink subframe (subframe # n+4) at a difference of an interval of 4 ms from the subframe (subframe # n) carrying the UL grant can be scheduled by using a downlink control information (Downlink Control Information, DCI) format (DCI format) 0/4, and an uplink subframe (for example, subframe # n+p, where p>4, and p is an integer) at a difference of an interval greater than 4 ms from the subframe carrying the UL grant can be scheduled by using a DCI format 0A/0B/4A/4B, but an uplink TTI/uplink subframe earlier than the minimum scheduling delay cannot be scheduled. When a shortest TTI in a system is a TTI of 1 ms or one subframe, the minimum scheduling delay is 3 ms or 4 ms, in other words, an uplink data channel scheduled by using a UL grant in subframe # n is in subframe # n+3 or subframe # n+4. When a shortest TTI in a system is an sTTI, the minimum scheduling delay is k uplink sTTIs or downlink sTTIs, where k is an integer greater than or equal to 4, in other words, an uplink data channel scheduled by using a UL grant in sTTI # n is in sTTI # n+k.

It should be noted that for scheduling based uplink transmission, information related to a transport format of an uplink data channel, including a time domain resource (in Manner 1, a time interval between a downlink TTI/subframe carrying a UL grant and a scheduled PUSCH is predefined, for example, 4 ms, and in this case, the time domain resource is implicitly indicated. In Manner 2, a time interval between a downlink TTI/subframe carrying a UL grant and a scheduled PUSCH is explicitly indicated by the UL grant), a frequency domain resource, a modulation and coding scheme (MCS), transmit power adjustment, a demodulation reference signal (DMRS) in the PUSCH, and the like is notified to the terminal device by using the UL grant. The terminal device performs packet encapsulation based on the transport format information indicated by the UL grant, and sends the PUSCH on the indicated time domain resource and the indicated frequency domain resource. However, for grantless uplink transmission, the information included in the transport format of the uplink data channel cannot be dynamically indicated by the base station by using the UL grant. A difference between the implementation provided in this embodiment of the present disclosure and the PUSCH that is scheduled by using the UL grant is that the first control information is used to indicate only a time domain resource available to the terminal device, but at least one piece of information, other than the time domain resource, related to the transport format corresponding to the uplink data channel sent by the terminal device is determined not based on the first control information. Specifically, the at least one piece of other information related to the transport format of the uplink data channel may be predefined, or may be configured based on third higher layer signaling sent by the base station device.

S104. The terminal device sends data information on an uplink data channel.

S105. The base station device receives, on the uplink data channel, the data information sent by the terminal device.

In some feasible implementations, information related to a transport format of the uplink data channel includes at least one of a frequency domain resource occupied by the uplink data channel, a modulation and coding scheme of the uplink data channel, transmit power of the uplink data channel, a code sequence of a demodulation reference signal in the uplink data channel, a transport block size (TBS) carried on the uplink data channel, and the like.

In other words, all information about the transport format of the uplink data channel. The scheduling based PUSCH, is indicated by same indication information (the UL grant), but some information (namely, the grantless time domain resource) of the transport format of the uplink data channel. The grantless PUSCH in this embodiment, is indicated by the first control information (namely, dynamic signaling) sent by the base station device, but other information is predefined, or other information is configured by using other signaling (for example, the third higher layer signaling sent by the base station device).

It should be noted that the frequency domain resource occupied by the uplink data channel includes at least one PRB, and the code sequence of the demodulation reference signal includes at least one of an orthogonal cover code (OCC) and a cyclic shift (CS) of the DMRS. Data sent from a Media Access Control (MAC) layer to a physical layer is organized in a form of a transport block (TB), and data information is carried and sent on an uplink data channel in the form of a TB. A TBS is an amount of valid data information (data information that is not encoded) that is included in a TB corresponding to a specific frequency domain resource (which may be specifically a quantity of PRBs) and a specific modulation and coding scheme. The terminal device may determine the TBS based on the frequency domain resource occupied by the uplink data channel and the modulation and coding scheme, or may determine the TBS based on information that is predefined or that is configured by using the third higher layer signaling sent by the base station device. For example, a value of the TBS is predefined, or is configured based on the third higher layer signaling sent by the base station device. In this case, the information related to the transport format may not include MCS information.

It should be noted that an existing eLAA system supports two-stage scheduling. The base station device sends scheduling information in a UL grant carried in a downlink burst, but a scheduling delay is not a delay of a PUSCH relative to a subframe in which the UL grant exists, but a delay of the PUSCH relative to a subframe in which a CPDCCH exists. After receiving only the UL grant, the terminal device does not send the PUSCH, and sends data information only after detecting the CPDCCH. The UL grant indicates a time interval between the PUSCH and the CPDCCH, and the CPDCCH triggers data information on the PUSCH to be sent. In comparison with the two-stage scheduling solution, the first control information described in the implementation provided in this embodiment of the present disclosure is also used to indicate the time domain resource, but the grantless time domain resource (including parameters such as the length and the start moment of the time domain resource) described in this embodiment of the present disclosure can be indicated only by the first control information compared with the CPDCCH in two-stage scheduling. However, in two-stage scheduling, the length of the time domain resource is indicated by other control information, namely, the UL grant, and the start moment of the time domain resource is determined based on both the CPDCCH and the other control information, namely, the UL grant.

It should be noted that, when data information is sent on the unlicensed spectrum, if the terminal device determines to send uplink data information in at least one subframe or TTI in a grantless time domain resource, before sending an uplink data channel, the terminal device needs to perform LBT on a carrier on which the uplink data channel carrying the uplink data information is located. The terminal device may immediately send the uplink data information when detecting that the channel is idle, and a type of the LBT includes one of random backoff-based CCA and single slot CCA. Details are not described herein again.

In this embodiment of the present disclosure, the base station device may send the first control information to the terminal device, and indicate, by using the first control information, the grantless resource that is after the downlink TTI or the downlink subframe carrying the first control information. A time interval between the start TTI or the start subframe in the grantless resource indicated by the first control information and the downlink TTI or the downlink subframe is relatively short, and the terminal device may send uplink data information on the grantless resource, so that time domain resource utilization is higher. In this embodiment of the present disclosure, the terminal device may send the uplink data information in a time shorter than a scheduling delay of a UL grant based scheduling mode, so that uplink data information sending efficiency can be improved, the uplink data information can be sent more flexibly, and applicability is higher.

Figure 7:
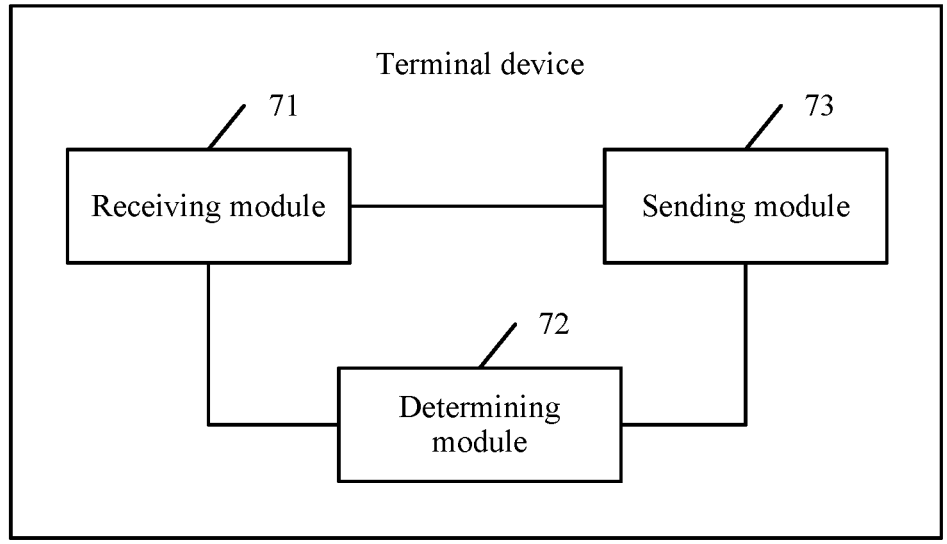
FIG. 7 is a schematic structural diagram of a terminal device according to an embodiment of the present disclosure.

Referring to FIG. 7, FIG. 7 is a schematic structural diagram of a terminal device according to an embodiment of the present disclosure. The terminal device provided in this embodiment of the present disclosure includes a receiving module 71, configured to receive first control information sent by a base station device in a first downlink transmission time interval, a determining module 72, configured to determine a time domain resource based on the first control information received by the receiving module, where the time domain resource includes at least one uplink transmission time interval, a start time unit of the time domain resource is later than the first downlink transmission time interval, and the start time unit is a first uplink transmission time interval of the at least one uplink transmission time interval, and a sending module 73, configured to send data information on an uplink data channel, where the uplink data channel corresponds to the at least one uplink transmission time interval in the time domain resource determined by the determining module.

In some feasible implementations, the determining module 72 is configured to determine the start time unit based on the first control information received by the receiving module.

In some feasible implementations, the determining module 72 is configured to determine a length of the time domain resource or an end moment of the time domain resource based on the first control information received by the receiving module.

In some feasible implementations, the determining module 72 is configured to determine the start time unit based on the first control information received by the receiving module, and determine an end moment of the time domain resource based on the start time unit and a length of the time domain resource, where the length of the time domain resource is a predefined length or a length configured based on first higher layer signaling sent by the base station device.

In some feasible implementations, the first control information is used to indicate a quantity of symbols occupied by the base station device in a last subframe or a last transmission time interval of a downlink burst, the downlink burst includes at least one consecutive downlink transmission time interval, and the at least one consecutive downlink transmission time interval includes the first downlink transmission time interval.

The determining module 72 is configured to determine the start time unit based on the quantity of symbols.

In some feasible implementations, the start time unit is later than a target time unit, and a time interval between the target time unit and the start time unit is a first time interval.

The target time unit is the first downlink transmission time interval, or the target time unit is a subframe in which the first downlink transmission time interval exists, or the target time unit is a last subframe or a last transmission time interval of a downlink burst, the downlink burst includes at least one consecutive downlink transmission time interval, and the at least one consecutive downlink transmission time interval includes the first downlink transmission time interval.

In some feasible implementations, the determining module 72 is configured to determine the target time unit based on the first control information received by the receiving module, and determine the start time unit based on the target time unit and the first time interval.

The first time interval is a predefined time interval, or the first time interval is configured by using second higher layer signaling sent by the base station device.

In some feasible implementations, the first control information is used to indicate the first time interval.

The determining module 72 is configured to determine the start time unit based on the first time interval and the target time unit.

In some feasible implementations, the determining module 72 is further configured to determine the target time unit based on the first control information received by the receiving module.

In some feasible implementations, a time interval between the first downlink transmission time interval and the start time unit is less than a second time interval, the second time interval is a minimum time interval between a second downlink transmission time interval and a target uplink transmission time interval, the second downlink transmission time interval carries the uplink grant, and the target uplink transmission time interval corresponds to an uplink channel scheduled by using the uplink grant.

The uplink grant is used to indicate a transport format of the uplink channel, and the transport format of the uplink channel includes at least one of the following information a time domain resource occupied by the uplink channel, a frequency domain resource occupied by the uplink data channel, a modulation and coding scheme of the uplink data channel, and a time interval between the second downlink transmission time interval and the target uplink transmission time interval.

In some feasible implementations, the first control information is common control information.

In some feasible implementations, the determining module 72 is further configured to determine a transport format of the uplink data channel.

The transport format of the uplink data channel includes at least one of the following information a frequency domain resource occupied by the uplink data channel, a modulation and coding scheme of the uplink data channel, transmit power of the uplink data channel, a code sequence of a demodulation reference signal in the uplink data channel, and a transport block size TBS carried on the uplink data channel.

Any one of the at least one piece of information included in the transport format of the uplink data channel is predefined information or information configured based on third higher layer signaling sent by the base station device.

Figure 8:
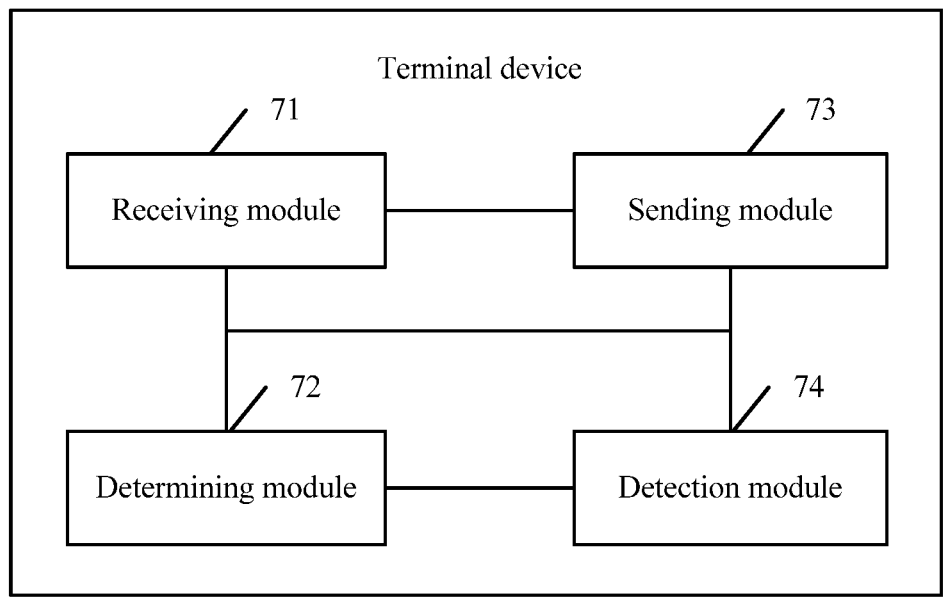
FIG. 8 is another schematic structural diagram of a terminal device according to an embodiment of the present disclosure.

In some feasible implementations, referring to FIG. 8, FIG. 8 is another schematic structural diagram of the terminal device according to this embodiment of the present disclosure. The terminal device provided in this embodiment of the present disclosure further includes a detection module 74, configured to perform listen before talk (LBT) on a carrier on which the uplink data channel is located, and detect that the channel is idle.

During specific implementation, the terminal device may perform, by using the modules built in the terminal device, the implementation described in the foregoing embodiment, and details are not described herein.

Figure 9:
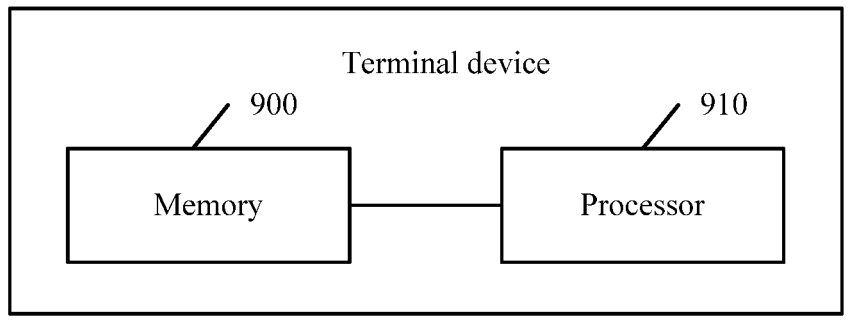
FIG. 9 is another schematic structural diagram of a terminal device according to an embodiment of the present disclosure.

Referring to FIG. 9, FIG. 9 is another schematic structural diagram of a terminal device according to an embodiment of the present disclosure. The terminal device provided in this embodiment of the present disclosure may include a memory 900 and a processor 910.

The memory 900 is configured to store a set of program code.

The processor 910 is configured to invoke the program code stored in the memory, to perform the implementation described in the steps in the uplink information sending method embodiment, and details are not described herein.

In this embodiment of the present disclosure, a base station device may send first control information to the terminal device, and indicate, by using the first control information, a grantless resource that is after a downlink TTI or a downlink subframe carrying the first control information. A time interval between a start TTI or a start subframe in the grantless resource indicated by the first control information and the downlink TTI or the downlink subframe is relatively short, and the terminal device may send uplink data information on the grantless resource, so that time domain resource utilization is higher. In this embodiment of the present disclosure, the terminal device may send the uplink data information in a time shorter than a scheduling delay of a UL grant based scheduling mode, so that uplink data information sending efficiency can be improved, the uplink data information can be sent more flexibly, and applicability is higher.

Figure 10:
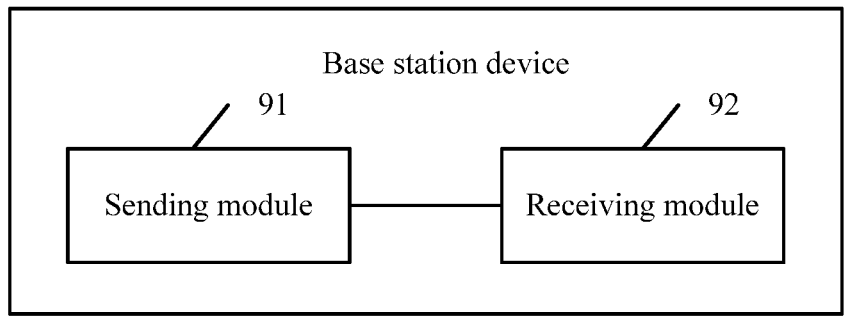
FIG. 10 is a schematic structural diagram of a base station device according to an embodiment of the present disclosure.

Referring to FIG. 10, FIG. 10 is a schematic structural diagram of a base station device according to an embodiment of the present disclosure. The base station device provided in this embodiment of the present disclosure may include a sending module 91, configured to send first control information to a terminal device in a first downlink transmission time interval, where the first control information is used to indicate a time domain resource, the time domain resource includes at least one uplink transmission time interval, a start time unit of the time domain resource is later than the first downlink transmission time interval, and the start time unit is a first uplink transmission time interval of the at least one uplink transmission time interval, and a receiving module 92, configured to receive, on an uplink data channel, data information sent by the terminal device, where the uplink data channel corresponds to the at least one uplink transmission time interval in the time domain resource.

In some feasible implementations, the first control information is used to indicate the start time unit.

In some feasible implementations, the first control information is used to indicate a length of the time domain resource or an end moment of the time domain resource.

In some feasible implementations, the first control information is used to indicate the start time unit, an end moment of the time domain resource is obtained based on the start time unit and a length of the time domain resource, and the length of the time domain resource is a predefined length or a length configured based on first higher layer signaling configured by the base station device for the terminal device.

In some feasible implementations, the first control information is used to indicate a quantity of symbols occupied by the base station device in a last subframe or a last transmission time interval of a downlink burst, the downlink burst includes at least one consecutive downlink transmission time interval, the at least one consecutive downlink transmission time interval includes the first downlink transmission time interval, and the quantity of symbols is used to determine the start time unit.

In some feasible implementations, the start time unit is later than a target time unit, and a time interval between the target time unit and the start time unit is a first time interval.

The target time unit is the first downlink transmission time interval, or the target time unit is a subframe in which the first downlink transmission time interval exists, or the target time unit is a last subframe or a last transmission time interval of a downlink burst, the downlink burst includes at least one consecutive downlink transmission time interval, and the at least one consecutive downlink transmission time interval includes the first downlink transmission time interval.

In some feasible implementations, the first control information is used to indicate the target time unit, the start time unit is obtained based on the target time unit and the first time interval, and the first time interval is a predefined time interval, or the first time interval is configured by using second higher layer signaling configured by the base station device for the terminal device.

In some feasible implementations, the first control information is used to indicate the first time interval, and the start time unit is obtained based on the target time unit and the first time interval.

In some feasible implementations, the target time unit is indicated by the first control information.

In some feasible implementations, a time interval between the first downlink transmission time interval and the start time unit is less than a second time interval, the second time interval is a minimum time interval between a second downlink transmission time interval and a target uplink transmission time interval, the second downlink transmission time interval carries the uplink grant, and the target uplink transmission time interval corresponds to an uplink channel scheduled by using the uplink grant.

The uplink grant is used to indicate a transport format of the uplink channel, and the transport format of the uplink channel includes at least one of the following information a time domain resource occupied by the uplink channel, a frequency domain resource occupied by the uplink data channel, a modulation and coding scheme of the uplink data channel, and a time interval between the second downlink transmission time interval and the target uplink transmission time interval.

In some feasible implementations, the first control information is common control information.

In some feasible implementations, the transport format of the uplink data channel includes at least one of the following information a frequency domain resource occupied by the uplink data channel, a modulation and coding scheme of the uplink data channel, transmit power of the uplink data channel, a code sequence of a demodulation reference signal in the uplink data channel, and a transport block size TBS carried on the uplink data channel.

Any one of the at least one piece of information included in the transport format of the uplink data channel is predefined information or information configured based on third higher layer signaling configured by the base station device for the terminal device.

During specific implementation, the base station device may perform, by using the modules built in the base station device, the implementation performed by the base station device in the descriptions of the foregoing embodiment, and details are not described herein.

Figure 11:
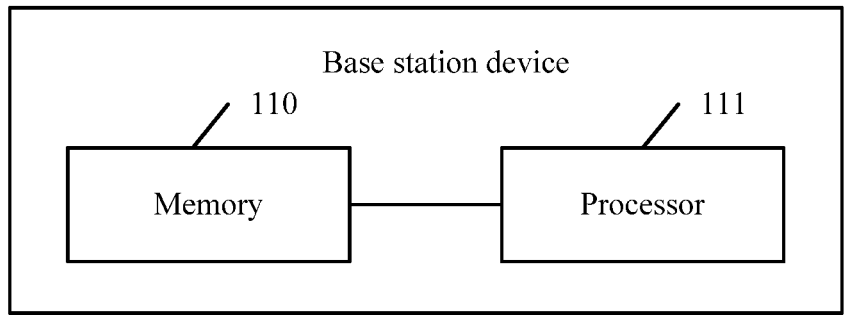
FIG. 11 is another schematic structural diagram of a base station device according to an embodiment of the present disclosure.

Referring to FIG. 11, FIG. 11 is another schematic structural diagram of a base station device according to an embodiment of the present disclosure. The base station device provided in this embodiment of the present disclosure may include a memory no and a processor 111.

The memory no is configured to store a set of program code.

The processor 111 is configured to invoke the program code stored in the memory, to perform the implementation described in the steps in the uplink information receiving method embodiment, and details are not described herein.

In this embodiment of the present disclosure, the base station device may send first control information to a terminal device, and indicate, by using the first control information, a grantless resource that is after a downlink TTI or a downlink subframe carrying the first control information. A time interval between a start TTI or a start subframe in the grantless resource indicated by the first control information and the downlink TTI or the downlink subframe is relatively short, and the terminal device may send uplink data information on the grantless resource, so that time domain resource utilization is higher. In this embodiment of the present disclosure, the terminal device may send the uplink data information in a time shorter than a scheduling delay of a UL grant based scheduling mode, so that uplink data information sending efficiency can be improved, the uplink data information can be sent more flexibly, and applicability is higher.

Figure 12:
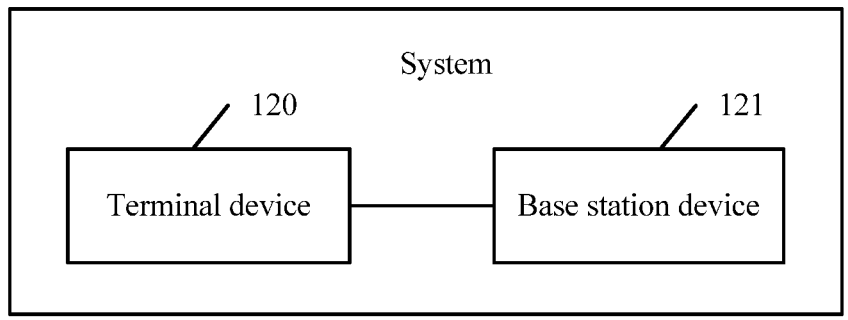
FIG. 12 is a schematic structural diagram of an uplink information processing system according to an embodiment of the present disclosure.

Referring to FIG. 12, FIG. 12 is a schematic structural diagram of an uplink information processing system according to an embodiment of the present disclosure. The system provided in this embodiment of the present disclosure may include a terminal device 120 and a base station device 121.

During specific implementation, the terminal device and the base station device may perform the implementation described in the steps in the foregoing embodiments, and details are not described herein.

In this embodiment of the present disclosure, the base station device may send first control information to the terminal device, and indicate, by using the first control information, a grantless resource that is after a downlink TTI or a downlink subframe carrying the first control information. A time interval between a start TTI or a start subframe in the grantless resource indicated by the first control information and the downlink TTI or the downlink subframe is relatively short, and the terminal device may send uplink data information on the grantless resource, so that time domain resource utilization is higher. In this embodiment of the present disclosure, the terminal device may send the uplink data information in a time shorter than a scheduling delay of a UL grant based scheduling mode, so that uplink data information sending efficiency can be improved, the uplink data information can be sent more flexibly, and applicability is higher.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may be a magnetic disc, an optical disc, a read-only memory (ROM), a random access memory (RAM), or the like.

What is disclosed above is merely example embodiments of the present disclosure, and certainly is not intended to limit the protection scope of the present disclosure. Therefore, equivalent variations made in accordance with the claims of the present disclosure shall fall within the scope of the present disclosure.

What is claimed is:

1. A method, comprising:
   receiving, by a terminal device from a base station device, common control information in a first downlink transmission time interval;
   determining, by the terminal device, a grantless time domain resource, the grantless time domain resource being used for grantless transmission by the terminal device based on the common control information, wherein the grantless time domain resource comprises at least one consecutive uplink transmission time interval, wherein a start time unit of the grantless time domain resource is later than the first downlink transmission time interval, and wherein the start time unit is a first uplink transmission time interval of the at least one consecutive uplink transmission time interval; and
   sending, by the terminal device, data information on an uplink data channel, wherein the uplink data channel corresponds to the at least one consecutive uplink transmission time interval in the grantless time domain resource.

2. The method according to claim 1, wherein the determining the grantless time domain resource comprises:
   determining, by the terminal device, the start time unit based on the common control information,
   wherein the start time unit is a first transmission time interval that closely follows a target transmission time interval, wherein the target transmission time interval is a last transmission time interval of a downlink burst carrying the common control information, and wherein the downlink burst comprises at least one consecutive downlink transmission time interval in which the base station device occupies a channel to perform sending.

3. The method according to claim 1, wherein the determining the grantless time domain resource comprises:
   determining, by the terminal device, a length of the grantless time domain resource based on the common control information, wherein the grantless time domain resource comprises a number of subframes that closely follow a target transmission time interval.

4. The method according to claim 1, wherein the grantless time domain resource is indicated by the common control information.

5. The method according to claim 1, further comprising: before the sending the data information on the uplink data channel:
   performing, by the terminal device, listen before talk (LBT) on a carrier on which the uplink data channel is located to detect that the uplink data channel is idle.

6. A method, comprising:
   sending, by a base station device to a terminal device, common control information in a first downlink transmission time interval, wherein the common control information indicates a grantless time domain resource used for grantless transmission by the terminal device, wherein the grantless time domain resource comprises at least one consecutive uplink transmission time interval, wherein a start time unit of the grantless time domain resource is later than the first downlink transmission time interval, and wherein the start time unit is a first uplink transmission time interval of the at least one consecutive uplink transmission time interval; and
   receiving, by the base station device from the terminal device, data information on an uplink data channel, wherein the uplink data channel corresponds to the at least one consecutive uplink transmission time interval in the grantless time domain resource.

7. The method according to claim 6, wherein the common control information further indicates the start time unit, and wherein the start time unit is a first transmission time interval that closely follows a target transmission time interval, wherein the target transmission time interval is a last transmission time interval of a downlink burst carrying the common control information, and wherein the downlink burst comprises at least one consecutive downlink transmission time interval in which the base station device occupies a channel to perform sending.

8. The method according to claim 6, wherein the common control information further indicates a length of the grantless time domain resource, and wherein the grantless time domain resource comprises a number of subframes that closely follow a target transmission time interval.

9. The method according to claim 6, wherein the grantless time domain resource is indicated by the common control information.

10. The method according to claim 6, wherein the common control information further indicates an end time unit of the grantless time domain resource.

11. A terminal device, comprising:
    a processor; and
    a non-transitory computer-readable storage medium storing a program to be executed by the processor, the program including instructions to:
    receive, from a base station device, common control information in a first downlink transmission time interval;
    determine a grantless time domain resource, the grantless time domain resource being used for grantless transmission by the terminal device based on the common control information, wherein the grantless time domain resource comprises at least one consecutive uplink transmission time interval, wherein a start time unit of the grantless time domain resource is later than the first downlink transmission time interval, and wherein the start time unit is a first uplink transmission time interval of the at least one consecutive uplink transmission time interval; and
    send data information on an uplink data channel, wherein the uplink data channel corresponds to the at least one consecutive uplink transmission time interval in the grantless time domain resource.

12. The terminal device according to claim 11, wherein the program further includes instructions to:
- determine the start time unit based on the common control information,
- wherein the start time unit is a first transmission time interval that closely follows a target transmission time interval, wherein the target transmission time interval is a last transmission time interval of a downlink burst carrying the common control information, and wherein the downlink burst comprises at least one consecutive downlink transmission time interval in which the base station device occupies a channel to perform sending.

13. The terminal device according to claim 11, wherein the program further includes instructions to:
- determine a length of the grantless time domain resource based on the common control information, wherein the grantless time domain resource comprises a number of subframes that closely follow a target transmission time interval.

14. The terminal device according to claim 11, wherein the grantless time domain resource is indicated by the common control information.

15. The terminal device according to claim 11, wherein the program further includes instructions to:
- before sending the data information on the uplink data channel:
  - perform listen before talk (LBT) on a carrier on which the uplink data channel is located to detect that the uplink data channel is idle.

16. A base station device, comprising:
- a processor; and
- a non-transitory computer-readable storage medium storing a program to be executed by the processor, the program including instructions for:
  - send, to a terminal device, common control information in a first downlink transmission time interval, wherein the common control information indicates a grantless time domain resource used for grantless transmission by the terminal device, wherein the grantless time domain resource comprises at least one consecutive uplink transmission time interval, wherein a start time unit of the grantless time domain resource is later than the first downlink transmission time interval, and wherein the start time unit is a first uplink transmission time interval of the at least one consecutive uplink transmission time interval; and
  - receive, from the terminal device, data information on an uplink data channel, wherein the uplink data channel corresponds to the at least one consecutive uplink transmission time interval in the grantless time domain resource.

17. The base station device according to claim 16, wherein the common control information further indicates the start time unit, and
- wherein the start time unit is a first transmission time interval that closely follows a target transmission time interval, wherein the target transmission time interval is a last transmission time interval of a downlink burst carrying the common control information, and wherein the downlink burst comprises at least one consecutive downlink transmission time interval in which the base station device occupies a channel to perform sending.

18. The base station device according to claim 16, wherein the common control information further indicates a length of the grantless time domain resource, and wherein the grantless time domain resource comprises a number of subframes that closely follow a target transmission time interval.

19. The base station device according to claim 16, wherein the grantless time domain resource is indicated by the common control information.

20. The base station device according to claim 16, wherein the common control information further indicates an end time unit of the grantless time domain resource.

* * * * *